United States Patent
Abe et al.

(10) Patent No.: US 7,593,542 B2
(45) Date of Patent: Sep. 22, 2009

(54) IMAGE PROCESSING APPARATUS, IMAGE PROCESSING METHOD, AND COMPUTER PRODUCT

(75) Inventors: Yasushi Abe, Kanagawa (JP); Satoshi Ohkawa, Tokyo (JP); Masayoshi Miyamoto, Kanagawa (JP); Jun Ebata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 613 days.

(21) Appl. No.: 11/207,955

(22) Filed: Aug. 19, 2005

(65) Prior Publication Data

US 2006/0072782 A1 Apr. 6, 2006

(30) Foreign Application Priority Data

Aug. 20, 2004 (JP) ............................. 2004-241309
Jul. 5, 2005 (JP) ............................. 2005-196724

(51) Int. Cl.
*G06K 9/00* (2006.01)
(52) U.S. Cl. .................. 382/100; 382/165; 382/306; 382/162; 382/250; 358/1.15; 358/1.14; 358/450; 358/3.28; 380/203; 713/176; 713/193
(58) Field of Classification Search ............... 382/100, 382/232, 240, 162, 276, 165; 358/1.15, 1.14, 358/450; 399/366; 713/176, 913
See application file for complete search history.

(56) References Cited

U.S. PATENT DOCUMENTS 6,600,571 B1 * 7/2003 Ito ............................. 358/1.15
6,845,170 B2 * 1/2005 Wendt ......................... 382/100
7,227,661 B2 * 6/2007 Matsunoshita .............. 358/1.15
2003/0076540 A1 * 4/2003 Hamashima et al. ........ 358/3.28
2004/0071364 A1 * 4/2004 Yamazaki et al. ........... 382/276
2005/0018845 A1 * 1/2005 Suzaki ........................ 380/243

FOREIGN PATENT DOCUMENTS

| JP | 2000-216990 A | 8/2000 |
| JP | 2002-010057 A | 1/2002 |
| JP | 2002010057 | * 1/2002 |
| JP | 2003298831 | * 10/2003 |
| JP | 2004080136 | * 3/2004 |
| JP | 2001-036720 | 2/2007 |

OTHER PUBLICATIONS

Japanese Office Action dated Jul. 3, 2007; JP Patent Application No. 2005-196724.
First Office Action (and English translation, 7 Pages) from Chinese Application No. 200510092107.4, Issue Date Nov. 9, 2007, 6 pgs.

* cited by examiner

*Primary Examiner*—Vikkram Bali
*Assistant Examiner*—Nancy Bitar
(74) *Attorney, Agent, or Firm*—Blakely, Sokoloff, Taylor & Zafman LLP

(57) ABSTRACT

An image processing apparatus includes an extracting unit to extract watermark data from image data of an image; a generating unit to generate a watermark image based on the watermark data; and a superimposing unit to superimpose the watermark image on the image.

21 Claims, 25 Drawing Sheets

| BYTE | 1 | $2 \sim k_1$ | $k_1+1 \sim k_2$ | $k_2+1 \sim k_3$ | ... | $k_{n-1}+1 \sim k_n$ |
|---|---|---|---|---|---|---|
| ITEM | DIGITAL-WATERMARK IDENTIFICATION INFORMATION | IMAGE FILE NAME | TYPE OF FILE | NUMBER OF PAGES | ... | INDIVIDUAL NAME |
| PRIORITY | – | 6 | 7 | – | ... | – |

COPY-REMAINING BACKGROUND PATTERN

COPY-DISAPPEARING BACKGROUND PATTERN

WWW.???.COM

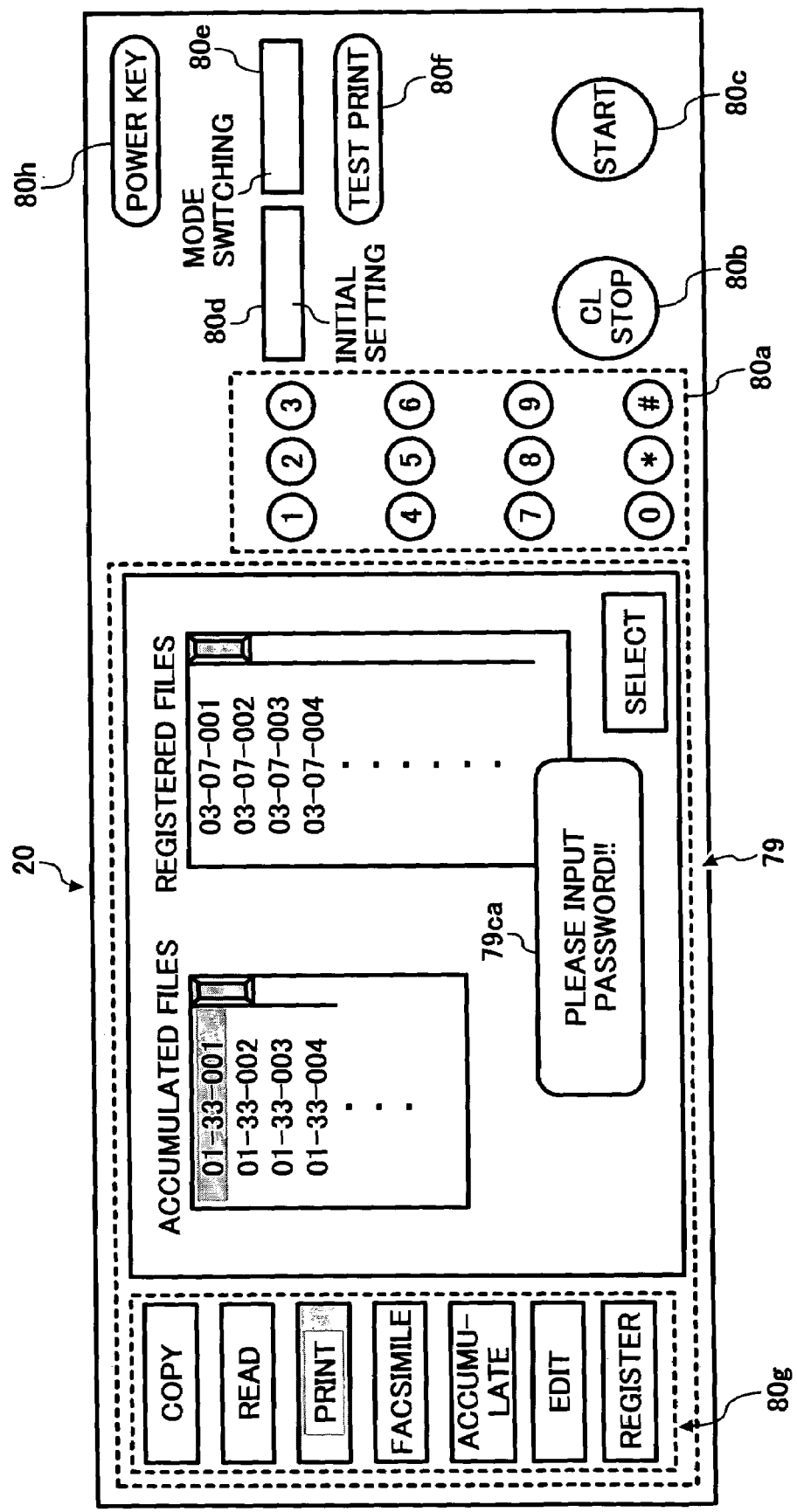

IMAGE PROCESSING APPARATUS, IMAGE PROCESSING METHOD, AND COMPUTER PRODUCT

The present document incorporates by reference the entire contents of Japanese priority documents, 2004-241309 filed in Japan on Aug. 20, 2004 and 2005-196724 filed in Japan on Jul. 5, 2005.

BACKGROUND OF THE INVENTION

1. Field of the Invention

The present invention relates to an image processing apparatus, an imaging processing method, and a computer product for extracting digital watermark data from image information.

2. Description of the Related Art

In recent years, images accumulated or registered in an image processing apparatus are transferred to an external apparatus, such as a personal computer (PC), through communication and output to a printer from the external apparatus more often than ever. Accordingly, problems such as counterfeiting and use of the images in defiance of copyrights are concerns. To tackle such problems, information necessary to prevent the counterfeiting and to identify an author is embedded in an image. Digital watermarking is often used to embed such information in an image. Various technologies are currently proposed as the digital watermarking.

For example, Japanese Patent Application Laid-Open No. 2002-10057 discloses a color-image-forming apparatus that adds tracking data to a print image as digital watermark data. Specifically, the color-image-forming apparatus adds, to the digital watermark data, data for tracking a destination apparatus to which the image is output, to form a tracking pattern. Then, the color-image-forming apparatus combines the tracking pattern with print data, and then outputs the print data to a printer.

However, in the above color image forming apparatus, if the destination apparatus does not have a function of extracting the digital watermark data, the tracking data is failed to be extracted. In other words, the digital watermark embedded in image data with a predetermined embedding method can only be extracted with an extraction method conforming to the predetermined embedding method. Thus, the digital watermark cannot be extracted with an extraction method not conforming to the predetermined embedding method.

SUMMARY OF THE INVENTION

An image processing apparatus, image processing method, and computer product as described. In one embodiment, the image processing apparatus comprises an extracting unit to extract watermark data from image data of an image, a generating unit to generate a watermark image based on the watermark data, and a superimposing unit to superimpose the watermark image on the image.

A method of processing an image according to another aspect of the present invention includes extracting watermark data from image data of an image, generating a watermark image based on the watermark data, and superimposing the watermark image on the image.

A computer-readable recording medium according to still another aspect of the present invention stores a computer program for realizing a method of processing an image according to the above method.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 14 is a schematic of an image to which a background pattern image is added as an identification (ID) as and a uniform resource locator (URL) as a footer;

FIG. 20 is a schematic of the operation board in a print mode;

DETAILED DESCRIPTION

An embodiment of the present invention to at least solve the problems in the conventional technology.

The other objects, features, and advantages of the present invention are specifically set forth in or will become apparent from the following detailed description of the invention when read in conjunction with the accompanying drawings.

Exemplary embodiments of the present invention are explained in detail below with reference to the accompanying drawings. Note that, in the explanation, an image processing apparatus includes a scanner, an image server, a printer, a facsimile apparatus, and a copying machine.

Figure 1:
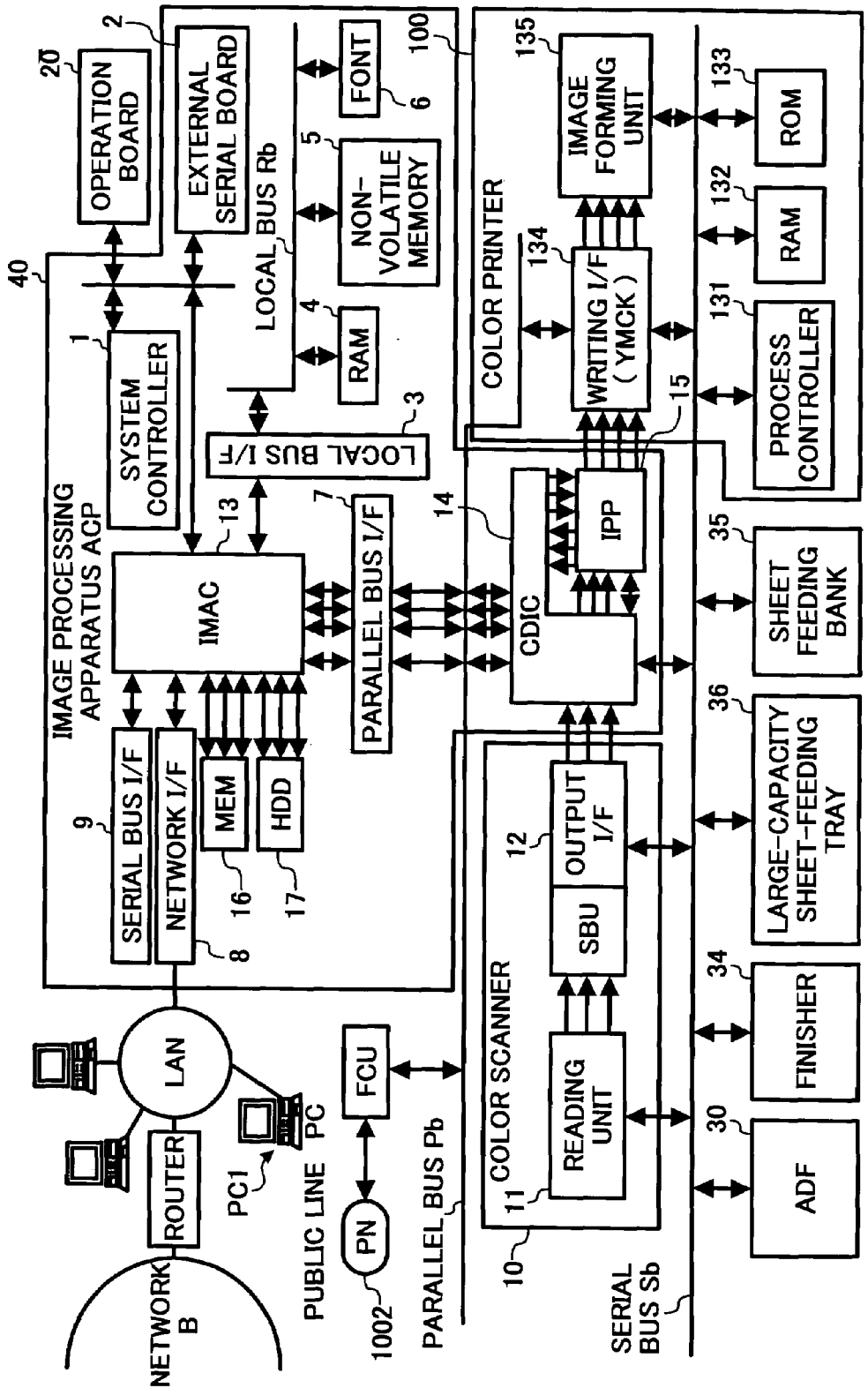
FIG. 1 is a block diagram of an image processing apparatus ACP, a color scanner, and a color printer according to an embodiment of the present invention.
Figure 4:
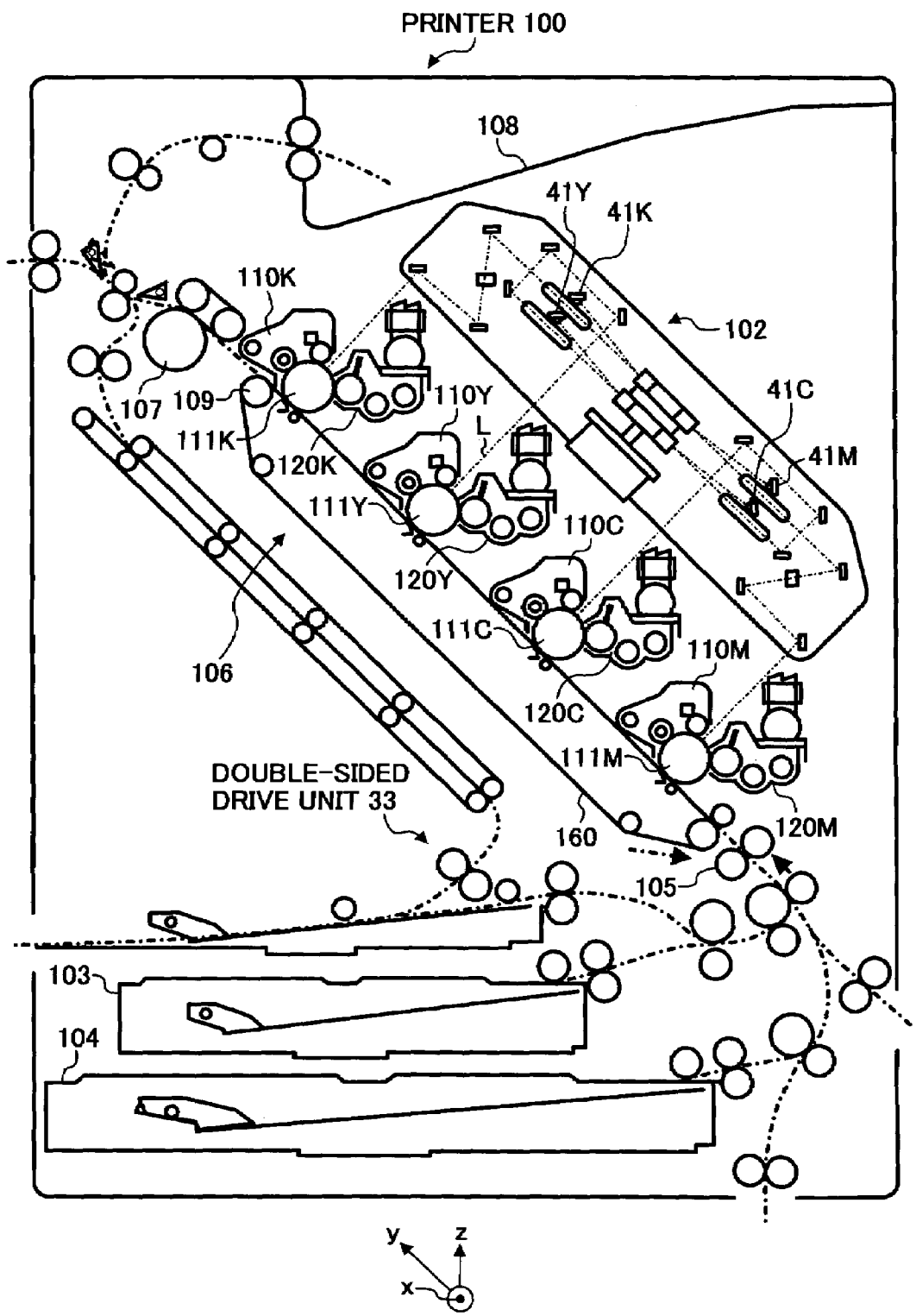
FIG. 4 is a schematic for illustrating an imaging forming mechanism of the color printer.

FIG. 1 is a block diagram of an image processing system of a copying machine according to an embodiment of the invention. In this system, a color scanner 10 that includes a reading unit 11 and an image-data output I/F 12 is connected to an image-data I/F control (hereinafter, "CDIC") 14 of an image processing apparatus (hereinafter, "ACP") 40. A printer 100 is also connected to the ACP 40. The printer 100 receives recorded image data in a writing I/F 134 from an image processing processor (IPP) 15 and prints the recorded image data in an image forming unit 135. The image forming unit 135 is as shown in FIG. 4.

In this system, the printer 100 is also connected to an automatic document feeder (ADF) 30, a finisher 34, a large-capacity sheet-feeding tray 36, a sheet feeding bank 35, and the like via a serial bus Sb.

The ACP 40 includes a parallel bus Pb, a memory access control (hereinafter, "IMAC") 13, a memory module (MEM) 16 serving as an image memory, a hard disk device (HDD) 17 serving as a nonvolatile memory, a system controller 1, a random-access memory (RAM) 4, a nonvolatile memory 5, a font read-only memory (ROM) 6, the CDIC 14, an IPP 15, an external serial board 2, a local bus I/F 3, a local bus Rb connecting the local bus I/F 3 and the RAM 4 and the like, a parallel bus I/F 7, a network I/F 8, and a serial bus I/F 9. A facsimile control unit (FCU) is connected to the parallel bus Pb. An operation board 20 is connected to the system controller 1.

The reading unit 11, which optically reads an original document, of the color scanner 10, photoelectrically converts reflected light of lamp irradiation on the original document with a charge coupled device (CCD) 207 (FIG. 3) on a sensor board unit (hereinafter simply referred to as SBU) to generate R, G, and B image signals. Then, the reading unit 11 converts the R, G, B image signals into RGB image data with an A/D converter, subjects the RGB image data to shading correction, and sends the RGB image data to the CDIC 14 through the output I/F 12. The RGB image data is multi-value image data (e.g., 8 bits) representing multi-gradation of 3 bits or more.

The CDIC 14 performs data transfer for image data among the color scanner 10 (the output I/F 12), the parallel bus Pb, and the IPP 15 and communication between a process controller 131 and the system controller 1 that controls the entire ACP 40. A ROM 132 is used as a work area for the process controller 131. A ROM 133 stores an operation program and the like for the process controller 131.

The IMAC 13 controls writing of image data and control data in and readout of image data and control data from the MEM 16 or the HDD 17.

The system controller 1 controls operations of the respective components connected to the parallel bus Pb. When the system controller 1 controls reception or the like of an image file, the system controller 1 generates or updates management information based on information and the like held by the respective components. Note that the management information is described later.

The RAM 4 is used as a work area for the system controller 1. The nonvolatile memory 5 stores an operation program and the like for the system controller 1.

The operation board 20 is used for instructing processing that the ACP 40 should perform. For example, a type of processing (copying, facsimile transmission, image reading, printing, etc.), the number of sheets to be processed, and the like are input from the operation board 20. Consequently, it is possible to input image data control information.

Image data read by the reading unit 11 of the color scanner 10 is subjected to shading correction in the SBU of the color scanner 10 and subjected to image processing for correcting reading distortion such as background removal, scanner gamma correction, and filter processing in the IPP 15. Then, the image data is accumulated in the MEM 16 or the HDD 17. When the image data in the MEM 16 or the HDD 17 is printed out, the RGB signals are converted into YMCK signals in the IPP 15 and subjected to image quality processing such as printer gamma conversion, gradation conversion, and gradation processing such as dither processing or error diffusion processing. After the image quality processing, the image data is transferred from the IPP 15 to the writing I/F 134. The writing I/F 134 applies laser control to the signals subjected to the gradation processing according to a pulse width and power modulation. Thereafter, the image data is set to the image forming unit 135. The image forming unit 135 forms a reproduced image on a transfer sheet.

The IMAC 13 includes a parallel bus control 171, an access control 172, a memory control 173, a serial port 174, a serial port control 175, a compression/expansion module 176, an image edition module 177, a network control 178, a system I/F 179, a local bus control 180, and a data modification module 181.

The IMAC 13 performs, based on the control of the system controller 1, access control for image data and the MEM 16 or the HDD 17, expansion of printing data for a PC 1000 connected on a local area network, and compression and expansion of image data for effective utilization of the MEM 16 or the HDD 17.

The IMAC 13 also performs, at the time of processing for image data, extraction and embedding of the data, modification for the data, or the like.

Image data sent to the IMAC 13 is accumulated in the MEM 16 or the HDD 17 after data compression. The image data accumulated is read out as required. The image data read out is expanded to be original image data and returned to the CDIC 14 from the IMAC 13 through the parallel bus Pb. After transfer from the CDIC 14 to the IPP 15, the image data is subjected to image quality processing and output to the writing I/F 134. A reproduced image is formed on a transfer sheet in the image forming unit 135.

In the flow of the image data, a function of a digital multi-function product is realized by bus control in the parallel bus Pb and the CDIC 14. Facsimile transmission is performed by applying image processing to read image data in the IPP 15 and transferring the image data to the FCU through the CDIC 14 and the parallel bus Pb. The FCU performs data conversion for a communication network to the image data and transmits the image data to a public line PN 1002 as facsimile data. Facsimile reception is performed by converting line data from the public line PN 1002 into image data in the FCU and transferring the image data to the IPP 15 through the parallel bus Pb and the CDIC 14. In this case, the image data is output from the writing I/F 134 without performing specific image processing. A reproduced image is formed on the transfer sheet in the image forming unit 135.

In a state in which plural jobs, for example, a copy function, a facsimile transmission/reception function, and a printer output function operate in parallel, the system controller 1 and the process controller 131 controls the of right to use the reading unit 11, the image forming unit 135, and the parallel bus Pb to the jobs. The process controller 131 controls flow of image data and the system controller 1 controls the entire system and manages start of respective resources. Selection of a function of the digital multifunction product is performed through the operation board 20. A content of processing such as a copy function and a facsimile function are set according to selective input from the operation board 20.

The system controller 1 and the process controller 131 communicate with each other through the parallel bus Pb, the CDIC 14, and the serial bus Sb. Specifically, data format conversion for data interface between the parallel bus Pb and the serial bus Sb is performed in the CDIC 14, whereby the system controller 1 and the process controller 131 communicate with each other.

Various bus I/Fs, for example, the parallel bus I/F 7, the serial bus I/F 9, the local bus I/F 3, and the network I/F 8 are connected to the IMAC 13. The system controller 1 is connected to related units through plural kinds of buses to keep independency in the entire ACP 40.

The system controller 1 controls other functional units through the parallel bus Pb. The parallel bus Pb is served for transfer of image data. The system controller 1 sends an operation control instruction for accumulating image data in the MEM 16 or the HDD 17 to the IMAC 13. This operation control instruction is sent through the IMAC 13, the parallel bus I/F 7, and the parallel bus Pb.

In response to this operation control instruction, the image data is sent from the CDIC 14 to the IMAC 13 through the parallel bus Pb and the parallel bus I/F 7. Then, the image data is stored in the MEM 16 or the HDD 17 according to the control of the IMAC 13.

On the other hand, when the printer function is called from the PC, the system controller 1 of the ACP 40 functions as a printer controller, a network control, and a serial bus control. When control is performed through a network B, the IMAC 13 receives print output request data or accumulation (storage) request data, which is sent through the network B, via the network I/F 8. The IMAC 13 informs the system controller 1 of request data (external command) sent through the network B. According to a command from the system controller 1 responding to the request data, the IMAC 13 transfers or receives and accumulates data sent through the network B.

The system controller 1 expands the print output request data from the PC to image data in an area of the MEM 16. Font data necessary for the expansion is obtained by referring to the font ROM 6 through the local bus I/F 3 and the local bus Rb. The local bus Rb connects this system controller 1 to the nonvolatile memory 5 and the RAM 4. As the serial bus Sb, other than an external serial port 2 for connection with the PC, there is an interface for transfer to and from the operation board 20 serving as an operation unit of the ACP 40. The I/F communicates with the system controller 1 through the IMAC 13 rather than print expansion data and performs reception of a processing procedure, display of a system state, and the like. Data transmission and reception between the system controller 1 and the MEM 16, the HDD 17, and the various buses are performed through the IMAC 13. Jobs using the MEM 16 or the HDD 17 are controlled unitarily in the entire ACP 40.

Figure 2:
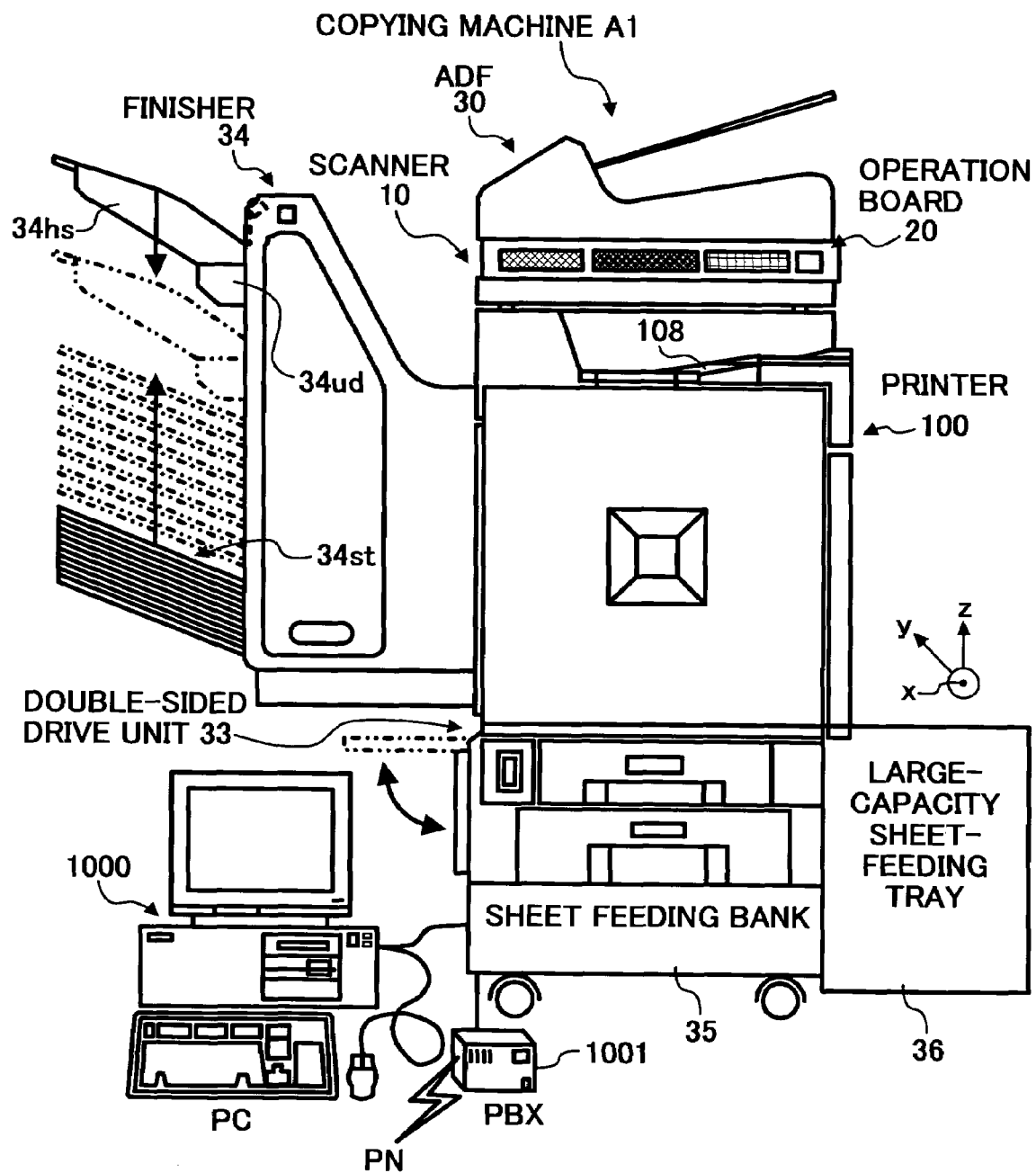
FIG. 2 is a front view of a multifunction color copier including the image processing apparatus ACP, the color scanner, and the color printer.

FIG. 2 is a front view of a multifunction full-color digital-copying-machine (hereinafter, "copying machine") A1 equipped with the ACP 40 shown in FIG. 1. The copying machine A1 includes the ADF 30, the operation board 20, the color scanner 10, the printer 100, and the sheet feeding bank 35. The finisher 34 including a stapler and a tray capable of stacking sheets with images formed thereon, a double-sided drive unit 33, and the large-capacity sheet-feeding tray 36 are mounted on the printer 100.

A local area network (LAN), to which the PC 1000 is connected, is connected to the ACP 40 (FIG. 1) in the copying machine. The CP 1000 and the ACP 40 connect to the network B, which is a wide area communication network, such as the Internet, via a router. A private branch exchange (PBX) 1001, which is connected to the public line PN (a facsimile communication line) 1002, is connected to the facsimile control unit FCU (FIG. 1). A sheet printed in the printer 100 is discharged onto a sheet discharge tray 108 or the finisher 34.

Figure 3:
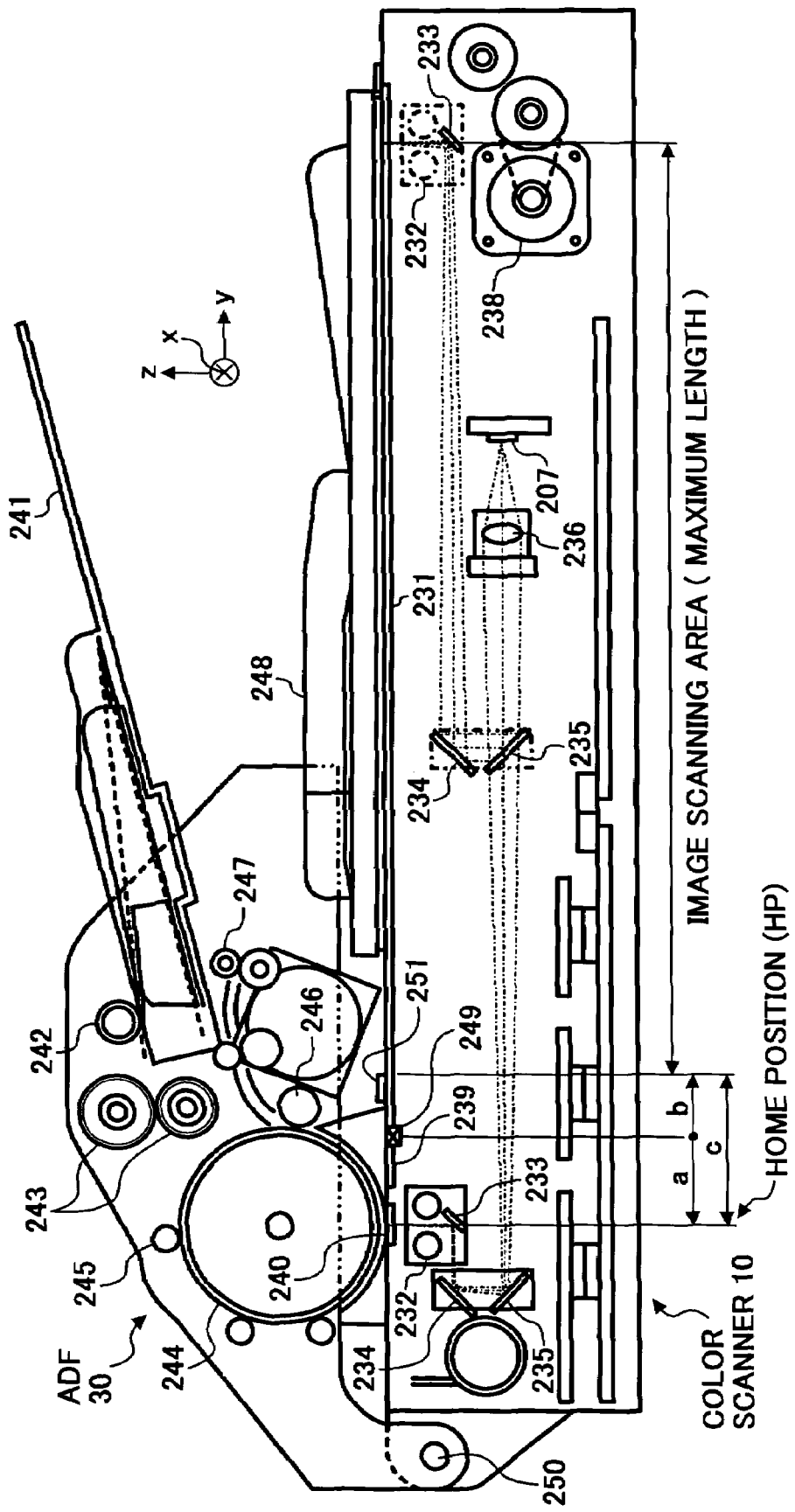
FIG. 3 is a schematic for illustrating a reading mechanism of the color scanner.

FIG. 3 is a schematic for illustrating a reading mechanism of the color scanner 10 and the ADF 30 mounted thereon. An original document placed on a contact glass 231 of the color scanner 10 is illuminated by lighting lamps 232 and light (image light) reflected on an original document is reflected in parallel to a sub-scanning direction y of a first mirror 233. The lighting lamps 232 and the first mirror 233 are mounted on a first carriage (not shown) that is driven at constant speed in the sub-scanning direction y. Second and third mirrors 234 and 235 are mounted on a second carriage (not shown) that is driven in the same direction as the first carriage at half speed of the speed the first carriage. The image light reflected by the first mirror 233 is reflected in a downward direction z by the second mirror 234, focused by a lens 236, irradiated on the CCD 207, and converted into an electric signal (reading of an original document manually placed on a contact lens). The first and the second carriages are driven in forward (original document scanning) and backward (return) in the direction y with a carrier motor 238 as a driving source (original document reading in a flat bed system). The CCD 207 is an imaging device that has a photoelectric conversion element array in which a large number of photoelectric conversion elements are arranged in a main scanning direction. The CCD 207 outputs an image reading signal of the array repeatedly in main scanning line sections.

The color scanner 10 is provided with the ADF 30. An original document on an original tray 241 of the ADF 30 is delivered into a space between a conveyance drum 244 and a pressing roller 245 by a pickup roller 242 and a registration roller pair 243. The original document adheres to the conveyance drum 244 and passes over a reading glass 240. Then, the original document is discharged onto a sheet discharge tray 248, which also serves as a pressure plate, below the original document tray 241 by sheet discharge rollers 246 and 247. When the original document passes over the reading glass 240, light is irradiated on the original document by the lighting lamps 232 that is positioned under the reading glass 240. Light reflected on the original document is irradiated on the CCD 207 via an optical system including the first mirror 233, and photoelectrically converted (original document reading in a sheet feed system).

A white reference board 239 and a source sensor 249, which detects the first carriage, are provided between the reading glass 240 and a scale 251 for positioning of a starting end of the original document. The white reference board 239 is prepared for correcting a phenomenon in which, although an original document having uniform concentration is read, read data fluctuates because of fluctuation in light emitting intensity of the respective lighting lamps 232, fluctuation in the main scanning direction, unevenness of sensitivity of each pixel of the CCD 207, or the like (shading correction). In this shading correction, first, the white reference board 239 is read by length equivalent to one line in the main scanning direction before scanning an original document. White reference data obtained by reading the white reference board 239 is stored in a memory. When an original image is read, image data is divided by the white reference data on the memory corresponding to the image data for each pixel that scans the original document.

FIG. 4 is a schematic for illustrating an imaging forming mechanism of the printer 100. The printer 100 in this embodiment is a laser printer. In the printer 100, four sets of toner image forming units for forming images of colors, magenta (M), cyan (C), yellow (Y), and black (K), are arranged along a moving direction of transfer paper (a direction from lower right to upper left in the figure) in this order. In other words, the printer 100 is a full-color image forming apparatus of a four-drum system.

The toner image forming units for magenta (M), cyan (C), yellow (Y), and black (K) include photosensitive units 110M, 110C, 110Y, and 110K, which have photosensitive drums 111M, 111C, 111Y, and 111K, and developing units 120M, 120C, 120Y, and 120K. The respective toner image forming units are arranged such that rotation axes of the photosensitive drums 111M, 111C, 111Y, and 111K in the respective photosensitive units are parallel to a horizontal x axis (the main scanning direction). In addition, the respective toner image forming units are arranged at predetermined pitch in the moving direction y of the transfer sheet (the sub-scanning direction).

The printer 100 includes, other than the toner image forming units, a laser exposure unit 102 using laser scanning, sheet feeding cassettes 103 and 104, a registration roller pair 105, a transfer belt unit 106 having a transfer conveyor belt 160 that conveys a transfer sheet to pass transfer positions of the respective toner image forming units, a fixing unit 107 of a belt fixing system, the sheet discharge tray 108, and the double-sided drive (surface reversal) unit 33. The printer 100 also includes a hand supply tray, a toner supply container, and a waste toner bottle (not shown).

The laser exposure unit 102 includes laser beam emitter 41M, 41C, 41Y, and 41K, a polygon mirror, an f-θ lens, and a reflection mirror. The laser exposure unit 102 irradiates a laser beam on surfaces of the photosensitive drums 111M, 111C, 111Y, and 111K based on image data while scanning a paper surface moving the laser beam in the main scanning direction x orthogonal to the paper surface.

An alternate long and short dash line in FIG. 4 indicates a conveyance path of transfer paper. The transfer sheet fed from the sheet feeding cassette 103 or 104 is conveyed by a conveyance roller while being guided by a not-shown conveyance guide and sent to the registration roller pair 105. The transfer sheet, which is delivered to the transfer conveyor belt 160 at predetermined timing by the registration roller pair 105, is conveyed by the transfer conveyor belt 160 to pass the transfer positions of the respective toner image forming units.

Toner images formed on the photosensitive drums 111M, 111C, 111Y, and 111K of the respective toner image forming units are transferred onto the transfer sheet conveyed by the transfer conveyor belt 160. The toner images of the respective colors are superimposed one on top of another to form a color image on the transfer sheet. The transfer sheet having the color image formed thereon is sent to the fixing unit 107. The transfer of the toner images is performed in a direct transfer system for directly transferring toner images onto transfer paper. The toner images are fixed on the transfer sheet when the transfer sheet passes the fixing unit 107. The transfer sheet having the color image fixed thereon is discharged or fed to the sheet discharge tray 108, the finisher 34, or the double-sided drive unit 33.

The toner image forming units are explained below with the toner image forming unit for yellow Y as an example. The other toner image forming units have the same constitution as the toner image forming unit for yellow Y. The toner image forming unit for yellow Y includes the photosensitive unit 110Y and the developing unit 120Y as described above. The photosensitive unit 110Y includes, besides the photosensitive drum 111Y, a brush roller that applies a lubricant to the surface of the photosensitive drum, a swingable blade that cleans the surface of the photosensitive drum, a charge eliminating lamp that irradiates light on the surface of the photosensitive drum, and a charging roller of a non-contact type that uniformly charges the surface of the photosensitive drum.

In the photosensitive unit 110Y, a laser beam L modulated based on print data and deflected by the polygon mirror is irradiated on the surface of the photosensitive drum 111Y, which is uniformly charged by the charging roller applied with an AC voltage, by the laser exposure unit 102 while scanning the surface. Then, an electrostatic latent image is formed on the surface of the photosensitive drum 111Y. The electrostatic latent image on the photosensitive drum 111Y is developed by the developing unit 20Y to be a toner image of yellow Y. The toner image on the photosensitive drum 111Y is transferred onto transfer paper in a transfer position on the transfer conveyor belt 160 where the transfer sheet passes. The surface of the photosensitive drum 111Y with the toner image transferred thereon is applied with a predetermined amount of lubricant by the brush roller and cleaned by the blade. Then, charges are eliminated from the surface of the photosensitive drum 111Y by light irradiated from the charge eliminating lamp. Consequently, the surface of the photosensitive drum 111Y prepares for formation of the next electrostatic image.

The developing unit 120Y houses a two-component developer containing a magnetic carrier and a toner charged negatively. The developing unit 120Y includes a developing roller, a conveyance screw, a doctor blade, a toner concentration sensor, and a power pump that are disposed to be partially exposed from an opening on the photosensitive drum side of the developing unit 120Y. The developer housed in the developer case is stirred and conveyed by the conveyance screw to be frictionally charged. A unit of the developer is carried on the surface of the developing roller. The doctor blade regulates thickness of the developer on the surface of the developing roller uniformly. The toner in the developer on the surface of the developing roller moves to the photosensitive drum 111Y. Consequently, a toner image corresponding to the electrostatic image appears on the photosensitive drum 111Y. Toner concentration of the developer in the developer case is detected by a toner concentration sensor. When the concentration is insufficient, the powder pump is driven to supply the toner.

The transfer conveyor belt 160 of the transfer belt unit 106 is wound around four grounded stretch rollers to pass the respective transfer positions that are in contact with and opposed to the photosensitive drums 111M, 111C, 111Y, and 111K of the respective toner image forming units. One of the stretch rollers is a stretch roller 109. An electrostatic attraction roller, to which a predetermined voltage is applied from a power supply, is arranged to be opposed to an entrance roller on an upstream side in a transfer sheet moving direction, which is indicated by an alternate long and two short dashes line, among these stretch rollers. The transfer sheet, which has passed between these two rollers, is electrostatically attracted onto the transfer conveyor belt 160. An exit roller on a downstream side in the transfer sheet moving direction is a driving roller that frictionally drives the transfer conveyor belt 160. The exit roller is connected to a driving source (not shown). A bias roller, to which a predetermined cleaning voltage is applied from the power supply, is arranged to be in contact with an outer peripheral surface of the transfer conveyor belt 160. This bias roller removes foreign matters such as the toner deposited on the transfer conveyor belt 160.

Transfer bias applying members are provided to be in contact with a rear surface of the transfer conveyor belt 160 forming a contact opposed section that is in contact with and opposed to the photosensitive drums 111M, 111C, 111Y, and 111K. These transfer bias applying members are stationary brushes made of Mylar. Transfer biases are applied to the transfer bias allying members from respective transfer bias power supply. A transfer charge is given to the transfer conveyor belt 160 by the transfer biases applied by the transfer bias applying members. Transfer electric fields of predetermined intensity are formed between the transfer conveyor belt 160 and the surfaces of the photosensitive drums in the respective transfer positions.

The sheet, which is conveyed by the transfer conveyor belt 160 and has the respective color toner images formed on the photosensitive drums 111M, 111C, 111Y, and 111K transferred thereon, is delivered into the fixing unit 107. The toner images are thermally fixed on the sheet by heating and pressurizing. After the thermal fixing, the sheet is delivered into the finisher 34 from a sheet discharge port 34ot of the finisher 34 in an upper unit of a left side plate. Alternatively, the sheet is discharged to the sheet discharge tray 108 in an upper surface of the printer body.

The photosensitive drums 111M, 111C, and 111Y among the four photosensitive drums are driven in single reduction via a power transmission system and a reduction gear (not shown) by one electric motor (a color drum motor; color drum M: not shown) for driving a not-shown color drum. The photosensitive drum 111K for forming a black image is driven in single reduction via a power transmission system and a reduction gear (not shown) by one electric motor (a K drum motor: not shown) for driving a black drum. The transfer conveyor belt 160 rotationally moves according to driving of the transfer driving roller via the power transmission system by the K drum motor. Therefore, the K drum motor drives the K photosensitive drum 111K and the transfer conveyor belt 60. The color drum motor drives the M, C, and Y photosensitive drums 11M, 11C, and 11Y.

The K developing unit 120K is driven via a power transmission system and a clutch (not shown) by an electric motor (not shown) that drives the fixing unit 107. The M, C, and Y developing units 120M, 120C, and 120Y are driven via a power transmission system and a clutch (not shown) by an electric motor (not shown) that drives the registration roller 105. The developing units 120M, 120C, 120Y, and 120K are not always driven. Driving force is transmitted to the developing units 120M, 120C, 120Y, and 120K by the clutches such that the developing units 120M, 120c, 120Y, and 120K can be driven at predetermined timing.

Referring back to FIG. 2, the finisher 34 includes a stacker tray, that is, a stack falling tray 34hs and a sort tray group 34st. The finisher 34 has a stacker sheet-discharge mode for discharging a sheet (printed paper, transferred paper) to the stack falling tray 34hs and a sorter sheet-discharge mode for discharging a sheet to the sort tray group 34st.

The sheet delivered into the finisher 34 from the printer 100 is conveyed in an upper left direction and passes a reversed U-shaped conveyance path. Then, a conveying direction of the sheet is switched to a downward direction. The sheet is discharged to the stack falling tray 34hs from a discharge port when the finisher is in the stacker sheet-discharge mode. The sheet is discharged to a sorter tray, which is allocated to the sheet being discharged, of the sort tray group 34st when the finisher 34 is in the sorter sheet-discharge mode.

When the sorter sheet-discharge mode is designated, a sheet discharge controller in the finisher drives the sort tray group 34st, which is placed in a retracted position at a lowermost section, upward to positions for use indicated by alternate long and two short dashes lines in FIG. 2 to increase intervals among the sorter trays. In the sorter sheet-discharge mode, in copying and printing of a set number of sheets for one time (one person), when the sorter sheet-discharge mode is set to copy sort, transfer sheets having an identical original document (image) printed thereon are sorted and housed in the respective trays of the sort tray group 34st. When the sorter sheet-discharge mode is set to page sort, the respective trays are allocated to respective pages (images) and transfer sheets having an identical page printed thereon are stacked on one sort tray.

Figure 5:
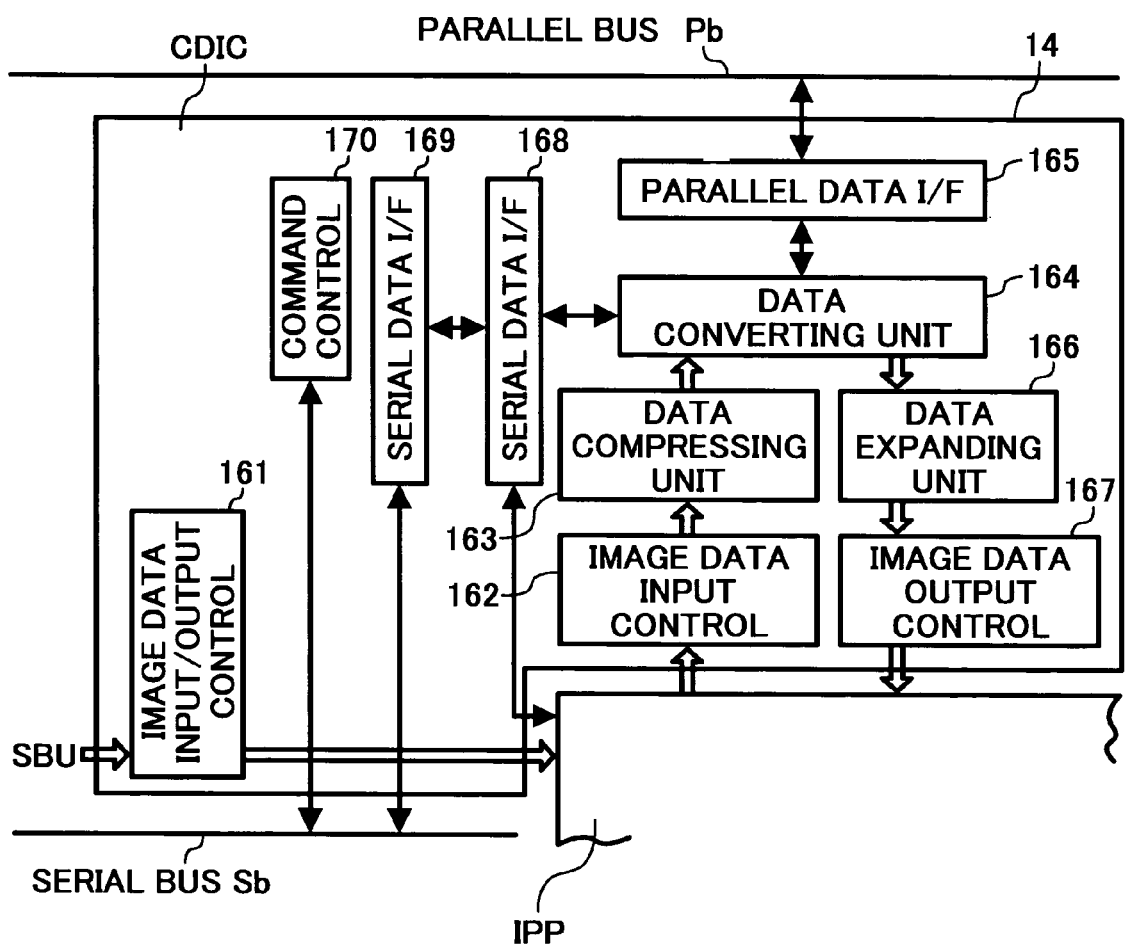
FIG. 5 is a block diagram of an image-data interface (I/F) control CDIC according to the embodiment.

FIG. 5 is a block diagram of the CDIC 14. The CDIC 14 includes an image-data input/output control 161, an image data input control 162, a data compressing unit 163, a data converting unit 164, a parallel data I/F 165, a data expanding unit 166, an image data output control 167, a serial data I/F 168, a serial data I/F 169, and a command control 170. The CDIC 14 is capable of communicating with the other components via the IPP 15 and the parallel bus Pb and the serial bus Sb.

In the CDIC 14, the image-data input/output control 161 receives image data output by the color scanner 10 (SBU) and outputs the image data to the IPP 15. The IPP 15 applies a scanner image processing 190 (FIG. 8) to the image data and delivers the image data to the image data input control 162 of the CDIC 14. The data received by the image data input control 162 is subjected to primary compression for image data in the data compressing unit 163 to improve transfer efficiency in the parallel bus Pb. The compressed image data is converted into parallel data in the data converting unit 164 and delivered to the parallel bus Pb via the parallel data I/F 165. The image data input from the parallel data bus Pb via the parallel data I/F 165 is subjected to serial conversion in the data converting unit 164. Since this data has been subjected to primary compression for bus transfer, the data is expanded in the data expanding unit 166. The expanded image data is transferred to the IPP 15 by the image data output control 167. In the IPP 15, RGB image data is converted into YMCK image data and converted into image data YpMpCpKp for image output of the printer 100 by an image quality processing 300 (FIG. 8) and output to the printer 100.

The CDIC 14 has both functions of converting parallel data transferred by the parallel bus Pb and serial data transferred by the serial bus Sb. The system controller 1 transfers data to the parallel bus Pb and the process controller 131 transfers data to the serial bus Sb. For communication between the system controller 1 and the process controller 131, the data converting unit 164 and the serial data I/F 169 perform parallel-to-serial conversion. The serial data I/F 168 is an interface for the IPP 15 and transfers serial data to the IPP 15 as well.

Figure 6:
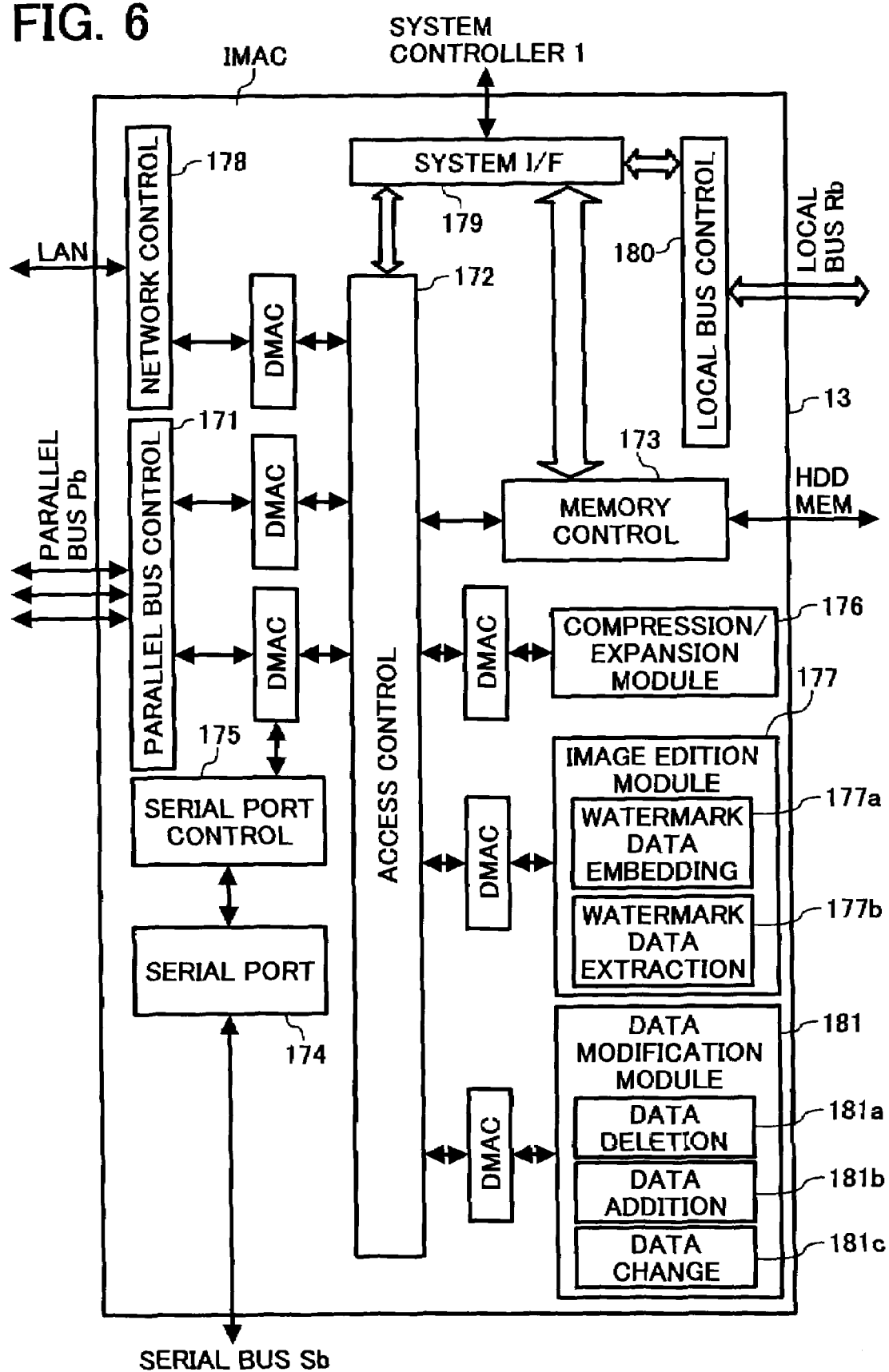
FIG. 6 is a block diagram of an image-memory access control IMAC according to the embodiment.

FIG. 6 is a block diagram of the IMAC 13. The IMAC 13 includes the access control 172, the memory control 173, the secondary compression/expansion module 176, the image edition module 177, the data modification module 181, the system I/F 179, the local bus control 180, the parallel bus control 171, the serial port control 175, the serial port 174, and the network control 178. The secondary compression/expansion module 176, the image edition module 177, the parallel bus control 171, the serial port control 175, and the network control 178 are connected to the access control 172 via direct memory access controls (DMACs).

The system I/F 179 transmits and receives instructions or data to and from the system controller 1. Basically, the system controller 1 controls the entire ACP 40. The system controller 1 manages resource distribution for the MEM 16 or the HDD 17 and controls the other units via the system I/F 179, the parallel bus control 171, and the parallel bus Pb.

The respective units of the ACP 40 are basically connected to the parallel bus Pb. Therefore, the parallel bus control 171 performs control for bus occupation to thereby manage transmission and reception of data to and from the system controller 1, the MEM 16, and the HDD 17.

The network control 178 controls connection with the LAN. The network control 178 manages transmission and reception of data to and from an external extension apparatus connected to the network. The system controller 1 is not involved in management for operations of apparatuses connected on the network. However, the system controller 1 controls the interfaces in the IMAC 13. Although not specifically limited, in this embodiment, control for 100BASE-T is added.

The serial port 174 connected to the serial bus includes a plurality of ports. The serial port control 175 includes port control mechanisms. The number of the port control mechanism corresponds to a type of prepared bus. Although not specifically limited, in this embodiment, the serial port control 175 performs port control for a universal serial bus (USB) and 1284. In addition, the serial port control 175 receives commands from the operation unit and controls transmission and reception of data related to display separately from an external serial port.

The local bus control 180 performs interface with the RAM 4, which is necessary for starting the system controller 1, the nonvolatile memory 5, and the local bus Rb to which the font ROM 6 for expanding print code data is connected.

An operation control carries out command control by the system controller 1 from the system I/F 179. A data control manages accesses from an external unit mainly to the MEM 16 and the HDD 17. Image data is transferred from the CDIC 14 to the IMAC 13 via the parallel bus Pb. The image data is captured into the IMAC 13 in the parallel bus control 171.

A memory access to the captured image data is separated from the management of the system controller 1. The memory access is performed by the DMACs independently from the system control. Concerning accesses to the MEM 16 and the HDD 17, the access control 172 arbitrates access requests from a plurality of units. The memory control 173 controls access operations for the MEM 16 and the HDD 17 and readout of data from and writing of data in the MEM 16 and the HDD 17.

When the MEM 16 or the HDD 17 is accessed from a network, data captured into the IMAC 13 from the network via the network control 178 is transferred to the MEM 16 or the HDD 17 by the DMACs. The access control 172 arbitrates accesses to the MEM 16 or the HDD 17 in a plurality of jobs. The memory control 173 reads out data from and writes data into the MEM 16 or the HDD 17.

When the MEM 16 or the HDD 17 is accessed from a serial bus, data captured into the IMAC 13 via the serial port 174 by the serial port control 175 is transferred to the MEM 16 or the HDD 17 by the DMACs. The access control 172 arbitrates accesses to the MEM 16 or the HDD 17 in a plurality of jobs. The memory control 173 reads out data from and writes data in the MEM 16 or the HDD 17.

The system controller 1 expands the print output data from a PC connected to the network or the serial bus to memory areas in the MEM 16 or the HDD 17 using font data on a local bus.

The system controller 1 manages the interfacing with respective external units. The DMACs shown in FIG. 6 manage memory access. In this case, the DMACs execute data transfer independently from one another. Thus, the access control 172 manages collision of jobs for accesses to the MEM 16 or the HDD 17 or set priorities for access requests.

The accesses to the MEM 16 or the HDD 17 include, other than accesses by the respective DMAC, an access from the system controller 1 via the system I/F 179 for bitmap expansion of stored data. DMAC data permitted to access the MEM 16 or the HDD 17 in the access control 172 or data from the system I/F 179 is directly transferred to the MEM 16 or the HDD 17 by the memory control 173.

The IMAC 13 includes the secondary compression/expansion module 176 and the image edition module 177 for data processing inside the IMAC 13. The secondary compression/expansion module 176 compresses and expands image data or code data such that the data can be accumulated in the MEM 16 or the HDD 17 effectively. The secondary compression/expansion module 176 controls interface with the MEM 16 or the HDD 17 by the DMACs.

The image data once stored in the MEM 16 or the HDD 17 is invoked to the secondary compression/expansion module 176 from the MEM 16 or the HDD 17 via the memory control 173 and the access control 172 by the DMACs. The image data subjected to data conversion in the secondary compression/expansion module 176 is returned to the MEM 16 or the HDD 17 or output to an external bus by the DMACs.

The image edition module 177 controls the MEM 16 or the HDD 17 through the DMACs to process image data in the MEM 16 or the HDD 17. Specifically, the image edition module 177 performs, other than the clearing of a memory area, rotation processing for image data, combination of different images, and the like as data processing. The image edition module 177 reads out secondary compressed data from the MEM 16 or the HDD 17 and expands the secondary compressed data to primary compressed data in the secondary compression/expansion module 176. The image edition module 177 expands the primary compressed data to image data with the same decoding logic as the data expanding unit 166 of the CDIC 14, and expands the image data in a memory in the image edition module 177, and processes the image data. The image data processed is subjected to primary compression with the same coding logic as the primary compression logic of the CDIC 14, further subjected to secondary compression in the secondary compression/expansion module 176, and written in the MEM 16 or the HDD 17.

The image edition module 177 has a watermark data embedding function 177a and a watermark data extracting function 177b. In embedding a watermark in character and picture information (image data) of an image file, the system controller 1 instructs the image edition module 177 to embed a digital watermark designating an object image file. The image edition module 177 gives information for accessing the image file to the watermark data embedding function 177a. The watermark data embedding function 177a accesses the image file in the MEM 16 or the HDD 17, writes control information present in the image file in a digital watermark data frame, replaces the character and picture information of the image file equivalent to an amount of data of this digital watermark data frame with the digital watermark data frame.

Any method may be used as a method of writing the digital watermark data in the character and picture information. For example, in this embodiment, information embedded as the digital watermark data frame is sectioned into groups of four bits. One bit is added to at the top of the four bits as a flag, and five-bit information is embedded in a least significant bit for every five pixels.

Consequently, in extracting the digital watermark data frame, a least significant bit of a first pixel is checked for every five pixels, which makes it possible to judge whether five-bit information is embedded in the five pixels. When it is judged that the five-bit information is embedded, information of a least significant bit of the following four pixels is extracted. It is possible to extract the digital watermark data frame by repeating the processing.

In extracting digital watermark data from character and picture information of an image file, the system controller 1 instructs the image edition module 177 to extract a digital watermark designating an object image file. The image edition module 177 gives information for accessing the image file to the data extracting function 177b. The data extracting function 177b accesses the image file in the MEM 16 or the HDD 17 and checks whether (header information of) a digital watermark data frame (digital watermark identification information) is present in a top area of the character and picture information in the image file. When the digital watermark data frame is present, the data extracting function 177b writes information indicating the presence of the digital watermark and control information for the digital watermark data frame in an output register and outputs the information to the system controller 1. When the digital watermark data frame is not present, the data extracting function 177b writes information indicating absence of the digital watermark data frame in the output register and outputs the information to the system controller 1.

Figures 7, 8:
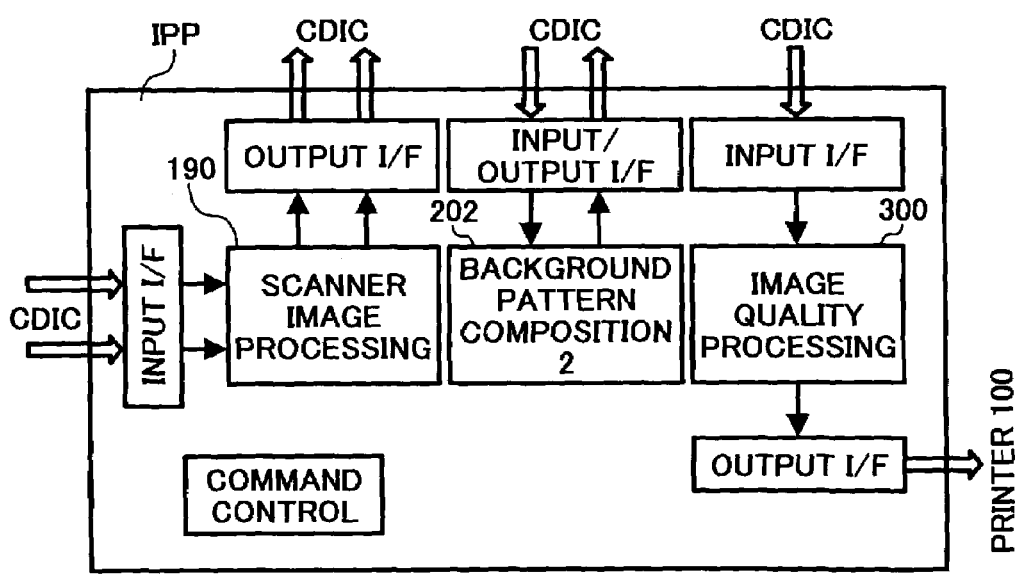
FIG. 7 is a table of association among a bit of a digital-watermark data frame, an item of management information, and priority in generating a background pattern image.
FIG. 8 is a block diagram of an outline of an image processing processor IPP according to the embodiment.

FIG. 7 is a table of association among a bit of a digital watermark data frame, an item of management information, and priority in generating a background pattern image. As shown in the figure, digital watermark identification information is stored in a first byte. For example, "0" indicates that the digital watermark identification information is not embedded and "1" indicates that the digital watermark identification information is embedded. Information corresponding to items of the management information is in second and subsequent bytes. By setting the items of the management information and the number of bits in advance for the second and subsequent bytes, the data extracting function 177b can extract information corresponding to the items. The MEM 16 or the HDD 17 is controlled by the DMACs to hold the data extracted in the MEM 16 or the HDD 17. The data held in the MEM 16 or the HDD 17 is invoked from a "background pattern composition 2" 202, a "background pattern composition 1" 204, or the like when necessary.

As shown in FIG. 7, priorities in embedding digital watermark identification information in association with the respective items are held. In other words, in generating a background pattern image, an amount of data that can be included in the background pattern image is limited. Thus, items to be embedded are determined according to the priorities. Consequently, it is possible to prevent a situation in which, although information on unnecessary items is included in the background pattern image after printing, information on necessary items is not included after the background pattern image is printed. In other words, it is possible to generate a background pattern image based on appropriate information. Items marked "-" in the priorities indicate information that does not have to be embedded as a background pattern image. Consequently, it is possible to prevent unnecessary information from being embedded.

The data modification module 181 includes a data deletion module 181a, a data addition module 181b, and a data change module 181c. In generating a background pattern image, the system controller 1 instructs the data modification module 181 to modify an extracted digital watermark before the system controller 1 generates the background pattern image. The data modification module 181 controls the MEM 16 or the HDD 17 using the DMACs and modifies the watermark data stored in the MEM 16 or the HDD 17. Specifically, the data modification module 181 compares a data capacity of the background pattern image and amounts of data of the respective items. The data deletion module 181a deletes information on items, which cannot be embedded, according to the priorities. For example, when the data modification module 181 judges, according to the data capacity, that items having first to sixth priorities can be embedded, information on items up to an image file name is embedded and information on items with priorities equal to or lower than that of a type of a file is not embedded. In this case, the data deletion module 181a deletes the information on the items, such as the type of a file.

In generating a background pattern, the data modification module 181 may add another piece of information to be embedded as a background pattern image to watermark data stored in the MEM 16 or the HDD 17. For example, when an image file is input from another PC, it is conceivable that the data addition module 181b adds information such as an IP address, which specifies a transmission date and time and a PC at a transmission destination, to the information for each item of the watermark data stored in the HDD 17 as management information used for management of the image file received.

In generating a background pattern, the data modification module 181 may change the watermark data stored in the MEM 16 or the HDD 17. For example, when a registration date and a reception date of the image file are held, it is conceivable that, for example, the data change module 181c changes "2005" indicating a year to "05", and writes "May 06, 2007" in a background pattern image as a registration date. Moreover, even if ranks "A", "B", "C", and "D" are embedded in the background pattern image, it is unclear for other users what the ranks mean. Thus, it is conceivable that the data change module 181c translates the ranks to "document not permitted to print", "important document", "document requiring special attention", and "usual document".

The data change module 181c performs processing for changing the watermark data according to a language code. It is assumed that this language code is used in a liquid-crystal touch panel 79 of the operation board 20 to switch Japanese, English, and the like. By using this language code, a background pattern image written in a language recognizable by users is generated according to modification by the data change module 181c. For example, when the language code indicates Japanese, the data change module 181c changes the registration date to "May 06, 2007" (year/month/day). When the language code indicates English, the data change module 181c changes the registration date and time to "Jul. 06, 2005" (day/month/year).

The data modification module 181 may change and designate a layout or the like in generating a background pattern image based on setting input by a user from the operation board 20. Specifically, when the user refers to, on the operation board 20, an image file to be superimposed and instructs a position of the background pattern image where characters and the like are arranged, the data modification module 181 modifies, based on the instruction, data such that the characters and the like of the background pattern image are arranged. Layout information required in generating background pattern information may be generated and held.

Although different from this embodiment, in generating a background pattern, the data modification module 181 may generate an ID for identifying the watermark data stored in the HDD 17 and embed the ID in a background pattern image. In other words, the data modification module 181 may change the watermark data to an ID, and then, superimpose the watermark data on a background pattern image in which the ID is embedded. For example, in this case, a URL for access is added to a header or a footer of an image file. When an image file in which the background pattern image is superimposed is printed, a user can refer to the watermark data by accessing the URL attached to the image file printed and inputting the ID embedded as the background pattern image. Consequently, even when the background pattern image is printed, it is possible to acquire data embedded as a digital watermark.

FIG. 8 is a block diagram of the IPP 15. A read image is transmitted from an input I/F of the IPP 15 to the scanner image processing 190 via the SBU and the CDIC 14. The scanner image processing 190 is provided for the purpose of correcting the deterioration in reading of a read image signal. Data is transferred to the CDIC 14 after shading correction, scanner gamma conversion, and the like, and accumulated in the MEM 16. Image data accumulated in the MEM 16 and read out is transferred to the IPP 15 again through the CDIC 14. Then, the image quality processing 300 is performed.

In transferring an image file in the MEM 16 or the HDD 17 to an information processing unit such as a PC 1, which is an external apparatus, via a network, the system controller 1 causes the image edition module 177 of the IMAC 13 to check whether digital watermark data is present in character and picture information present in the image file. When digital watermark data is present in the character and picture information, the system controller 1 combines a background pattern image having a content corresponding to management information, which is extracted and output by the data extracting function 177b, with an image of the image file using the background pattern composing function "background pattern composition 2" 202 of the IPP 15. Image information of the image file transferred to the PC 1 may be document data (text data) or may be image data (pixel data). In both the cases, in composing a background pattern image, it is easy to use a method of superimposing a background pattern image layer on an object image surface. Therefore, one embodiment of the invention does not intend to exclude this form of layer superimposition. However, to make it difficult to delete a background pattern image intentionally in the PC 1 and improve reliability of background pattern bearing, in this embodiment, when background pattern adding object data is image data, the "background pattern composition 2" 202 combines the image data with background pattern of one pixel/one bit. When the background pattern adding object data is document data, the "background pattern composition 2" 202 converts the document data into an image using the font ROM, converts the image into image data of one pixel/one bit with dither processing or gradation processing such as error diffusion processing, and combines the image data with the background pattern image data of one pixel/one bit. In other words, a pixel having an image component of the background pattern adding object image or the background pattern image is set as a bit with an image component according to an OR operation.

Figure 9:
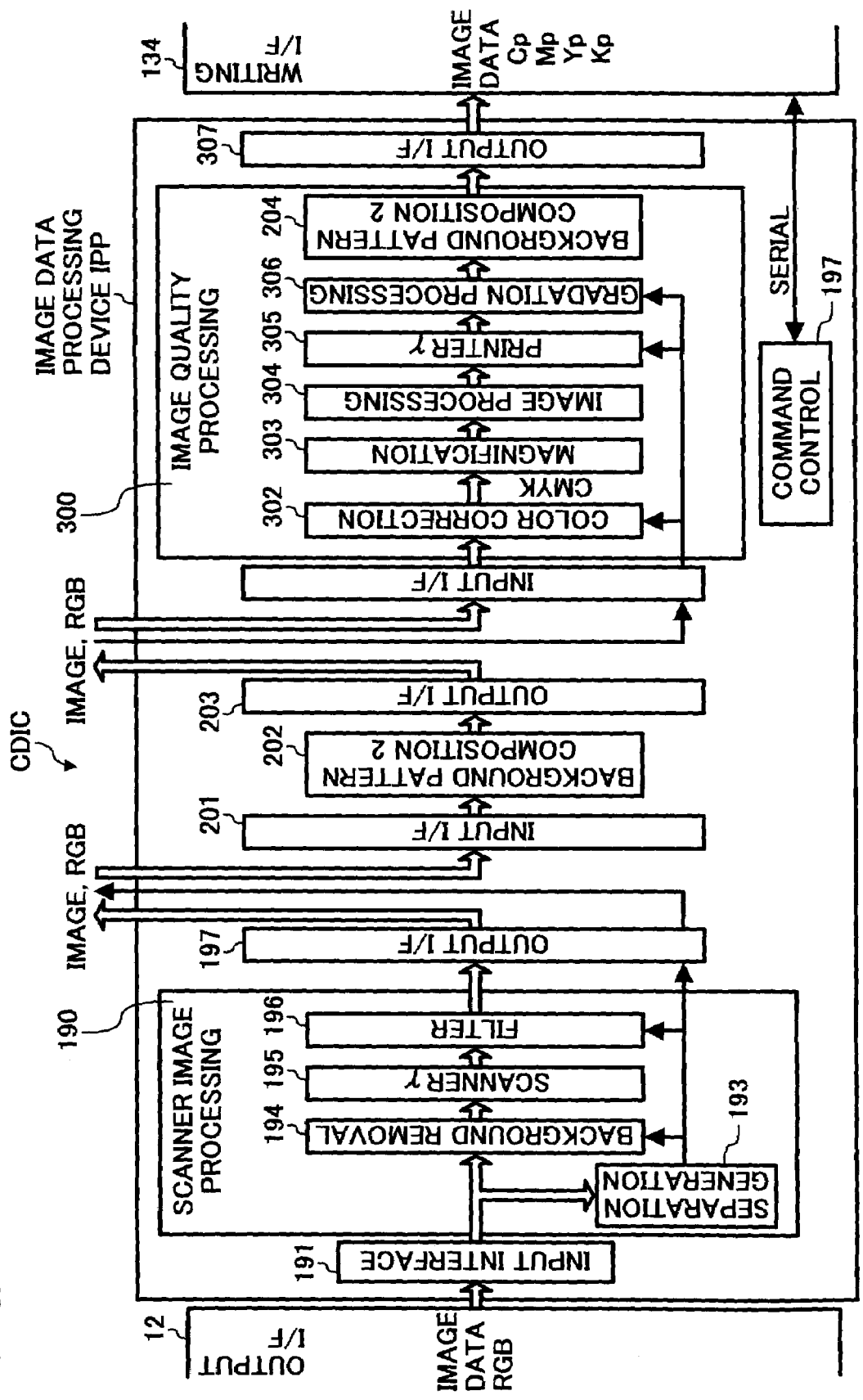
FIG. 9 is a block diagram of the image processing processor IPP.

FIG. 9 is a block diagram of the IPP 15. The IPP 15 performs separation generation (a judgment on whether an image is a character area or a picture area: image area separation) 193, background removal 194, scanner gamma conversion 195, filter 196, "background pattern composition 2" 202, color correction 302, magnification 303, image processing 304, printer gamma conversion 305, gradation processing 306, and "background pattern composition 1" 204.

The IPP 15 further includes an input interface 191 and an output interface 197 as interfaces for the scanner image processing 190, includes an input interface 201 and an output interface 203 as interfaces for the "background pattern composition 2" 202, and includes an input interface and an output interface 307 as interfaces for the image quality processing 300.

The IPP 15 is a programmable arithmetic processing unit that performs image processing. Image data, which is input from the output I/F 12 of the color scanner 10 to the CDIC 14, is transferred to the IPP 15 through the CDIC 14. The IPP 15 corrects signal deterioration (signal deterioration in a scanner system) of the image data due to an optical system and quantization to a digital signal. Then, the image data is output (transmitted) to the CDIC 14 again. The IPP 15 applies the "image quality processing" 300 to the image data returned to the IPP 15 from the CDIC 14. In the "image quality processing" 300, the IPP 15 converts RGB signals into YMCK signals in the color correction 302 and performs the magnification 303, the image processing 304, the printer gamma conversion 305, and the gradation processing 306 such as gradation conversion, dither processing, or error diffusion processing. If instructed, the IPP 15 also performs the "background pattern composition 1" 204 and the like.

When the printing of an image file in the MEM 16 or the HDD 17 is instructed from the external apparatus such as the PC 1 or the operation board 20, the system controller 1 causes the image edition module 177 of the IMAC 13 to check whether digital watermark data is present in character and picture information present in the image file. When digital watermark data is present in the character and picture information, the system controller 1 combines a background pattern image corresponding to management information, which is extracted and output by the data extracting function 177b, with an image of the image file using the background pattern composing function "background pattern composition 2" 204 of the IPP 15. Since image data to be added with a background pattern is converted into print data of one pixel/one bit in the gradation processing 306 before this "background pattern composition 1" 204, the system controller 1 composes one pixel/one bit of background pattern image data with respective pixel bits. In other words, a pixel having an image component of the background pattern adding object image or the background pattern image is set as a bit with an image component according to the OR operation of bits.

Figure 10:
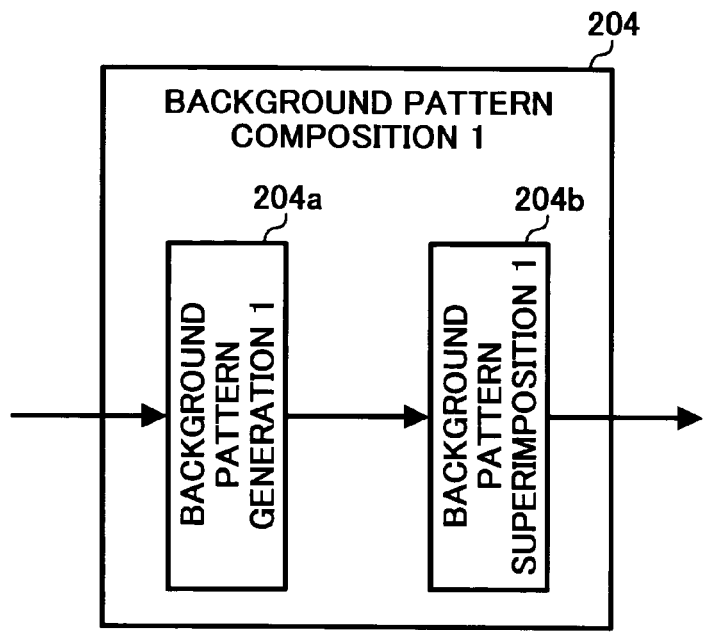
FIG. 10 is a schematic of a background pattern composition 1 according to the embodiment.

FIG. 10 is a schematic of the "background pattern composition 1" 204 according to the embodiment. As shown in FIG. 10, the "background pattern composition 1" 204 includes a "background pattern generation 1" 204a and a "background pattern superimposition 1" 204b. The "background pattern composition 1" 204 generates a background pattern image having a content corresponding to an extracted digital watermark and superimposed the background pattern image generated on an image of an image file. Note that, since the "background pattern composition 2" 202 also includes a "background pattern generation 2" 202a and a "background pattern superimposition 2" 202b, and performs the same processing as the "background pattern composition 1" 204, the "background pattern composition 2" 202 is not explained.

The "background pattern generation 1" 204a generates a background pattern image having a content corresponding to watermark data held in the MEM 16 or the HDD 17. The "background pattern superimposition 1" 204b superimposes the background pattern image generated on the image file. In this embodiment, the background pattern image having content corresponding to watermark data indicates a background pattern image in which watermark data, which a user can recognize visually, is included. As a specific example, after printing the image file on which the background pattern image is superimposed, this print is copied to visualize the watermark data held in the MEM 16 or the HDD 17 as characters. Thus, the user can visually recognize the watermark data.

Figure 11:
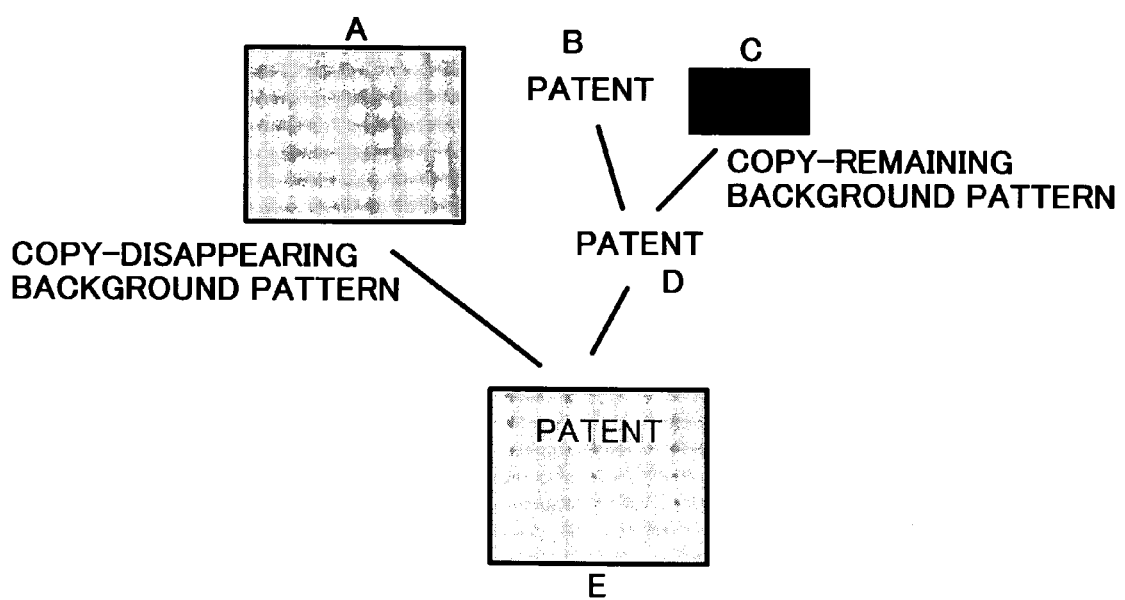
FIG. 11 is a schematic for illustrating data expansion on a memory in a process of generating a background pattern by the background pattern composition 1.

FIG. 11 is a schematic for illustrating data expansion on a memory in a process of generating a background pattern by the "background pattern composition 1" 200. The "background pattern generation 1" 204*a* of the "background pattern composition 1" 204 secures an area, which is necessary for generating a background pattern, on the memory (the RAM 4). The "background pattern generation 1" 204*a* subjects a copy-disappearing background pattern held by the "background pattern generation 1" 204*a* in advance to bitmap expansion shown in an image (A) using the area secured. In parallel to the bitmap expansion, the "background pattern generation 1" 204*a* creates copy control characters. As described above, data embedded as a background pattern image is stored in the MEM 16 or the HDD 17. Thus, the "background pattern generation 1" 204*a* acquires the data. The "background pattern generation 1" 204*a* subjects a character string to expansion as shown in an image (B) using bitmap data of a predetermined font, size, and inclination. The "background pattern generation 1" 204*a* subjects a copy-remaining background pattern to bitmap expansion as shown in an image (C). Note that, naturally, areas of the respective images (A), (B), and (C) shown in FIG. 11 are expanded in separate areas.

The "background pattern generation 1" 204*a* performs AND processing of bitmap data of a character string to be copy control characters and bitmap data of the copy-remaining background pattern to generate the copy control characters. The "background pattern generation 1" 204*a* overwrites the bitmap data of the copy control characters created in this way on a predetermined position of an area in which the copy-remaining background pattern is expanded to thereby create a background pattern image shown in an image (E).

The "background pattern superimposition 1" 204*b* superimposes the background pattern image created on character and picture information of the image file.

At a stage when the image file obtained by superimposing the created background pattern image on the character and picture information is printed, the characters or the like embedded as the background pattern image are not conspicuous. For example, in a print obtained by printing the image file on which the background pattern image shown in the image (E) is printed, it is difficult for the user to recognize characters "patent". When the print is copied, the characters "patent" appear on a white background in the print. This is because the copy-disappearing background pattern is erased at a copy stage and the copy-remaining background pattern remains even after the print is copied. Note that any pattern may be used as the copy-remaining background pattern and the copy-disappearing background pattern regardless of whether the pattern is well known or not.

Moreover, in this embodiment, the background pattern image is such an image that characters do not appear clearly when the image is just printed but appear clearly when the image printed is copied. However, character information may be added using such a pattern that can be recognized by the user without being copied, that is, the pattern can be recognized when the image is just printed. In this case, since the character information or the like added can be also recognized, it is possible to hold information embedded as a digital watermark even when the image is printed.

In this case, background pattern images may be set such that a background image with a higher management rank has higher concentration and brighter color in association with the management ranks A, B, C, and D and no rank, respectively. Consequently, an attention drawing effect and an information damage effect at the time of printing and copying are high. Several background pattern images associated with the management ranks A, B, C, and D and no rank, respectively, are registered in an HDD 27. One of the background pattern images is selected and set for one management rank. It is possible to change this setting using an initial setting function of the operation board 20.

Figure 12:
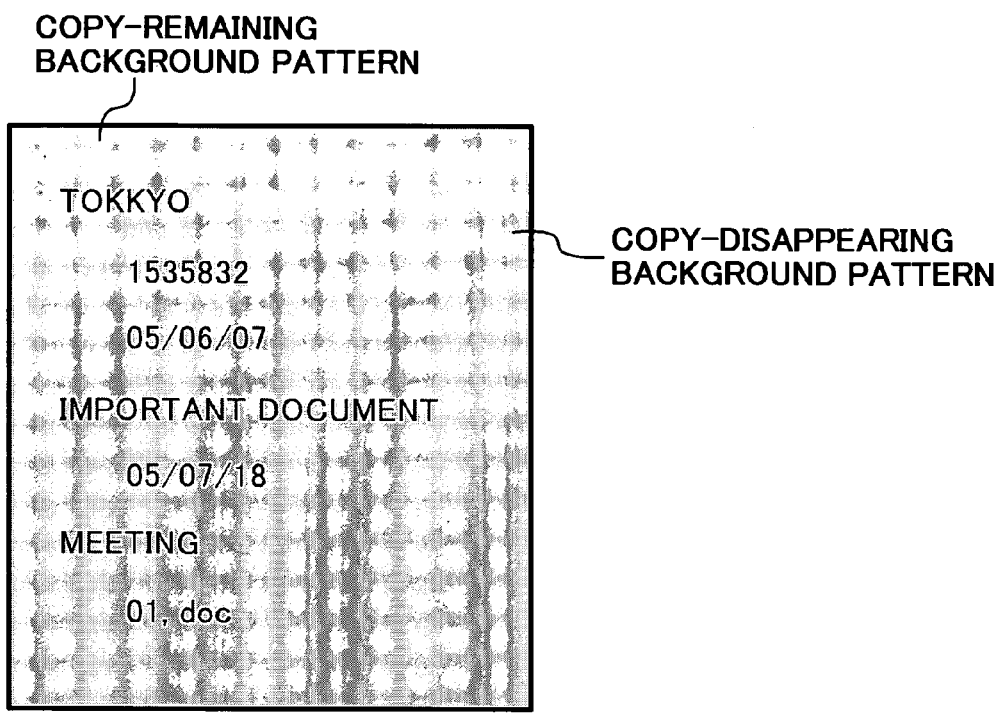
FIG. 12 is a schematic of the background pattern image generated by the background pattern generation 1.

FIG. 12 is a schematic of the background pattern image generated. As shown in the figure, character information such as data included in an image file as watermark data is written as a background pattern. The character information is written in the copy-remaining background pattern and a background is written in the copy-disappearing background pattern. This makes it possible to continue to hold data held as the watermark data even after the image is printed such that a user can recognize the data.

Figure 13:
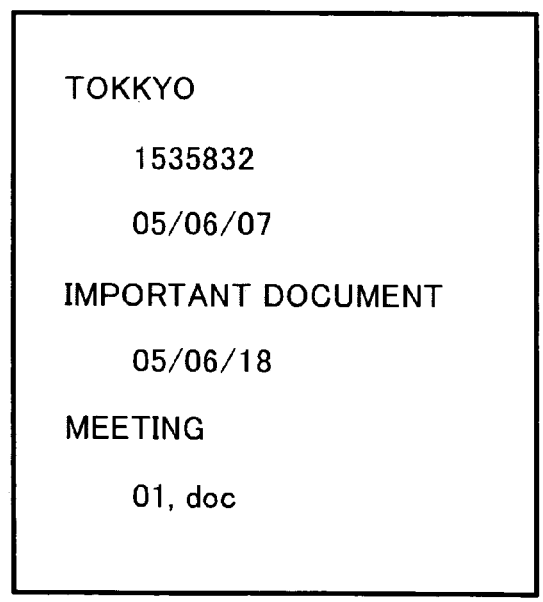
FIG. 13 is a schematic of a copy of a print to which a background pattern image has been added.

FIG. 13 is a schematic of a copy of a print to which a background pattern image shown in FIG. 12 has been added. As shown in the figure, the copy-disappearing background pattern is erased and the character information written in the copy-remaining background pattern remains. Consequently, since the embedded character information appears when the print is copied, it is possible to confirm information managed in association with the image file. In the first place, this information is obtained by extracting information embedded as a digital watermark and modifying the information extracted to be embedded as a background pattern image. In other words, the information embedded as the digital watermark can also be confirmed even when processed in an apparatus without recognizing the digital watermark.

It is also conceivable to add an ID as a background pattern image and write a URL for access as a header or a footer. FIG. 14 is a schematic of an image to which an ID is added as a background pattern image and in which a URL is written as a footer. As shown in the figure, since the URL is written, a user can check a source of the image or the print. It is also possible to refer to management information or the like associated with the URL and the ID by accessing the URL and inputting the ID.

Consequently, since the ID is embedded as background pattern information, other apparatuses or users can easily acquire information held as watermark data by requesting information from the copying machine A1 based on the ID and sending the information held as the watermark data.

In this way, it is possible to recognize embedded information by superimposing the watermark data or the information that can be specified by the watermark data as characters, without using a special apparatus having functionality for recognizing the information. In other words, even in an environment in which a digital watermark cannot be recognized, it is possible to acquire information held as the digital watermark in an image.

In composing a background pattern image, the system controller 1 gives data designating a background pattern image present in the HDD 17 corresponding to management rank information in the management information to the IPP 15 (the "background pattern composition 2" 202 or the "background pattern composition 1" 204). In addition, the system controller 1 converts the management information (text data)

into image data (pixel bit), which uses the font ROM 6, with the IMAC 13 and outputs the image data to the IPP 15. The IPP 15 combines an image obtained by superimposing the management information on the background pattern image with an image to be combined.

Figure 15:
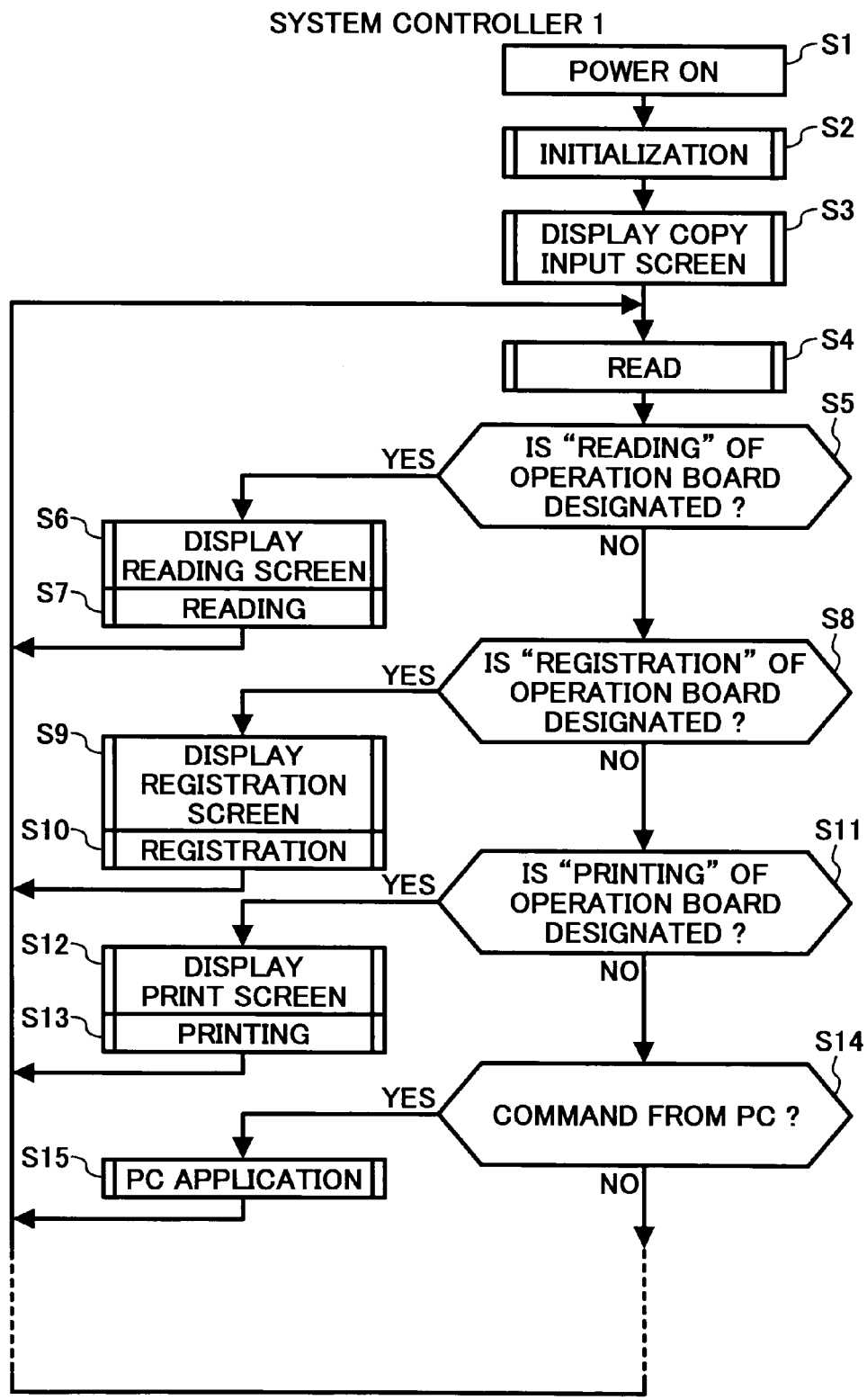
FIG. 15 is a flowchart of an image processing control by a system controller of the image processing apparatus ACP.

FIG. 15 is a flowchart of an image processing control by the system controller 1 shown in FIG. 1. When the copying machine A1 is turned on and a working voltage is applied to the copying machine A1 from a power supply (not shown) (step S1), the system controller 1 executes initialization processing responding to power-on (step S2). The system controller 1 displays a standby screen for copy mode input set in default (standard) shown in FIG. 16 on the liquid-crystal touch panel 79 of the operation board 20 via a central processing unit (CPU) (not shown) of the operation board 20 (step S3).

The system controller 1 reads an input to the operation board 20 and switches display on the operation board 20 via the CPU in the operation board 20. However, in the following description, it is assumed that the operation board 20 performs the reading and the switching.

The system controller 1 waits for an input from the operation board 20 or a command from the PC 1, and when an input is received, the system controller 1 reads and decodes the input or the command (step S4).

Figure 16:
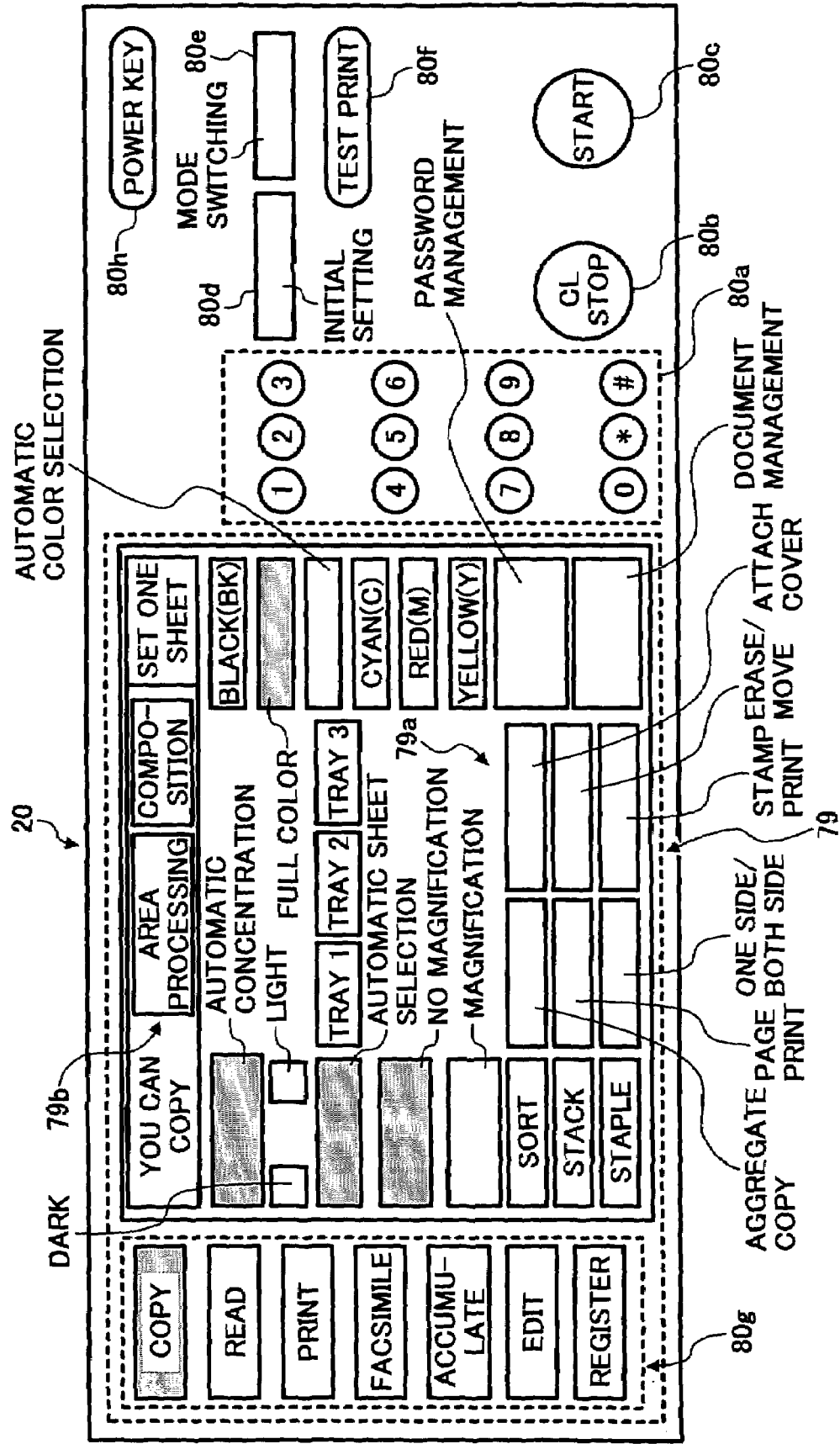
FIG. 16 is a schematic of an operation board according to the embodiment in a copy mode.

As shown in FIG. 16, the operation board 20 includes, besides the liquid-crystal touch panel 79, a numeric key pad 80*a*, a clear/stop key 80*b*, a start key 80*c*, an initial setting key 80*d*, a mode clear key 80*e*, and a test print key 80*f*. The test print key 80*f* is a key for printing only one copy regardless of a set number of prints and confirming a result of the printing. It is possible to customize an initial state of the machine arbitrarily by pressing the initial setting key 80*d*. It is possible to set the size of sheets stored by the machine and set a state, which is set when a reset key of a copy function is pressed, arbitrarily. When the initial setting key 80*d* is operated, a selection key for designating an "initial value setting" function for setting various initial values, a "password registration" function, a "copyright registration/setting" function, an "output of a use result" function, and the like is displayed. It is also possible to select an application or the like that is selected preferentially when no operation is performed for a fixed time, set time for shifting to low power complying with the international energy star, and set time shifting to an auto-off/sleep mode.

A message or the like indicating states of various function keys and an image forming apparatus is displayed on the liquid-crystal touch panel 79. A function selecting key 80*g* representing selection of a copy function, a scanning function, a print function, a facsimile function, an accumulation function, an edition function, a registration function, and other functions and execution of the functions is displayed on the liquid-crystal touch panel 79. Note that the accumulation function is a function of storing image data of an original document read by the color scanner 10, facsimile reception data, and image data from a PC in an accumulation area of the HDD 17. However, an "accumulation" key on the liquid-crystal touch panel 79 is an operation key for accessing an accumulated file (retrieval and display for confirming a file name, attribute information, and a thumbnail image). The registration function is a function of storing data in a registration area of the HDD 17. With this function, among image files stored in the accumulation area of the HDD 17, an image file that is commonly used by many users, an image file desired to be stored for a long period, and an image file for which special management is desired to be set are stored in the registration area of the HDD 17. A "registration" key on the liquid-crystal touch panel 79 is an operation key for starting this registration function.

An input/output screen corresponding to a function designated by the function selecting key 80*g* is displayed on the liquid-crystal touch panel 79. For example, when the copy function is designated, as shown in FIG. 16, function keys 79*a* and 79*b* and messages indicating the number of copies and a state of the image forming apparatus are displayed. When an operator touches a key displayed on the liquid-crystal touch panel 79, a key indicating a selected function is reversed to be displayed in gray. When details of a function have to be designated, for example, a type of page printing, a setting screen for detailed functions is displayed by touching a key. Since the liquid-crystal touch panel 79 uses a dot display device, it is possible to perform optimum display graphically.

Figure 17:
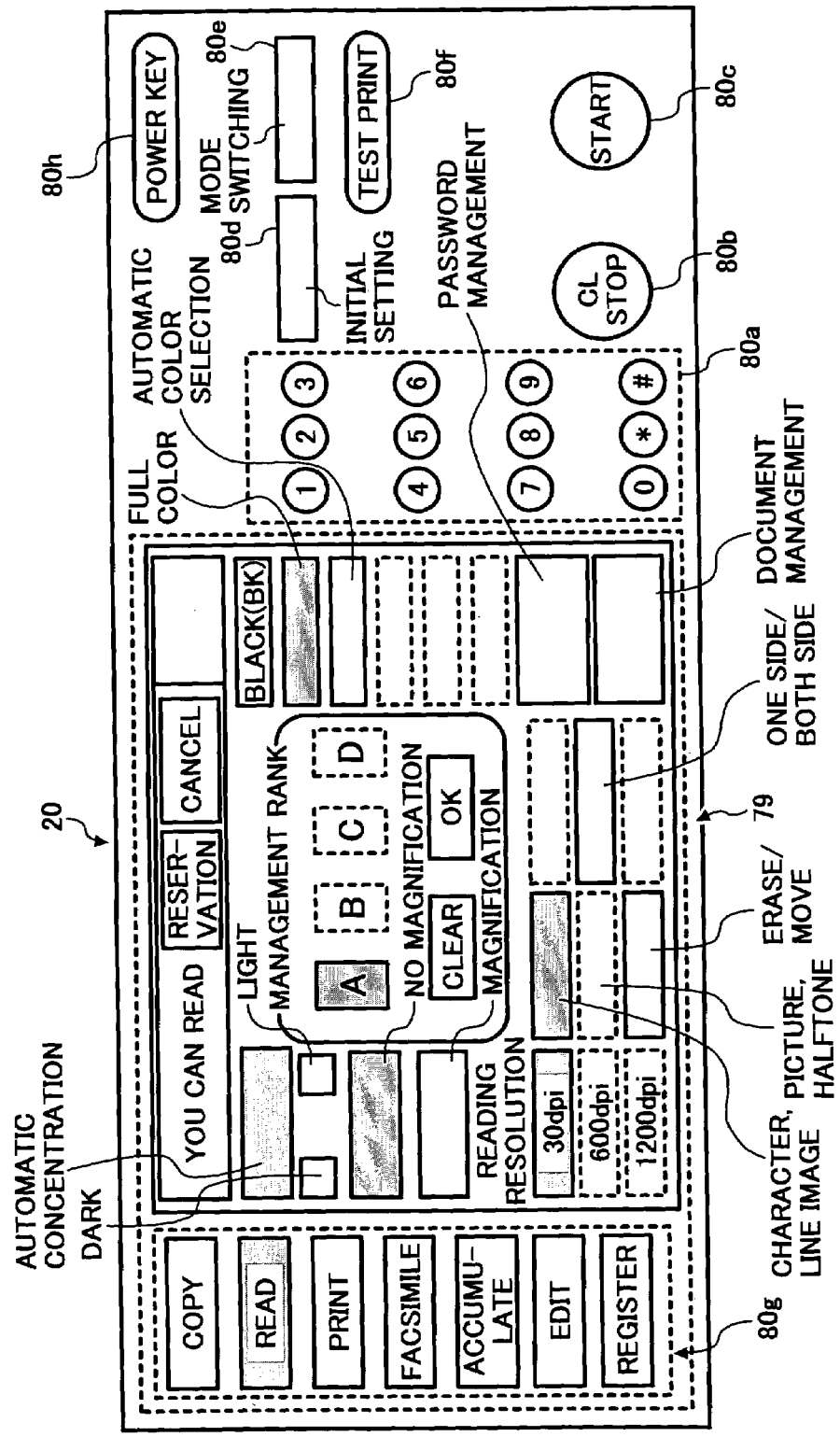
FIG. 17 is a schematic of the operation board in a reading mode.

Referring back to FIG. 15, at step S5, when the system controller 1 confirms that the "reading" key is operated (touched) in the input reading (step S4), the system controller 1 displays a reading screen on the liquid-crystal touch panel 79 (step S6) and executes reading (step S7). The reading screen is shown in FIG. 17.

When the system controller 1 reads, at step S8, that the "registration" key is operated in the input reading (step S4) in FIG. 15, the system controller 1 displays a registration screen on the liquid-crystal touch panel 79 (step S9) and executes registration (step S10). A registration destination on the HDD 17, a name of an image file to be registered, and information form of character and picture information are input on the registration screen.

When the system controller 1 reads, at step S11, that the "print" key is operated in the "input reading" (step S4) in FIG. 15, the system controller 1 displays a printing screen on the liquid-crystal touch panel 79 (step S12) and executes printing (step S13). In FIG. 20, display on the liquid-crystal touch panel 79 at the time when a user touches "printing" in the function selecting key 80*g* and designates one of accumulated/registered files in the HDD 17 is shown.

When the system controller 1 reads a command from the PC 1000 in the input reading (step S4), the system controller 1 executes a PC application (step S15).

The reading at step S7 shown in FIG. 15 is explained with reference to FIG. 18. The system controller 1 displays the reading screen (FIG. 17) on the liquid-crystal touch panel 79 and proceeds to the reading (step S7). Then, the system controller 1 generates an image file in the accumulation area of the HDD 17 (step S1701) and reads a management rank input in the liquid-crystal touch panel 79 by the user (step S1702). The management rank on the display of the reading screen (FIG. 17) is a kind of management information attached to image data read by the color scanner 10. In this embodiment, there are four ranks A to D. Processing described below is allocated to these ranks.

Rank A: Printing is prohibited.
Rank B: Printing is performed when user authentication is successful; printing is prohibited when user authentication is not successful.
Rank C: Notice indicating that printing is managed.
Rank D: Printing can be performed freely (no control).

A state in which the default rank A is designated in the management rank is shown in FIG. 17. A default rank can be changed according to initial setting using the initial setting key 80*d*. When the user touches a button of the rank B shown in FIG. 17, a button of the rank A is switched to white indicating that the rank A is not designated. The button of the rank B is switched to gray display indicting that the rank B is designated. Rank designation information indicating the rank A in an input register of the operation board 20 is updated to rank designation information indicating the rank B.

Referring back to FIG. 18, when the user ends input in a frame of the management rank and operates the start key 80c of the operation board 20, the system controller 1 reads data in the input register of the operation board 20 (step S1702). The system controller 1 performs image reading by the color scanner 10 and writing of read image data in the MEM 16 (step S1703). The system controller 1 generates management information for the image data and writes the management information in an image file generated this time in the accumulation area on the HDD 17 (step S1704). The management information includes an image file name, a type of a file, the number of pages, a directory on the copying machine A1, a management rank, a source (an ID of a user and an ID of the copying machine A1), a transfer destination, a registration date and time, and an edition history. The ID of the copying machine A1 in the source is a domain name and an individual name (a global IP address and a private IP address) of the copying machine A1. The transfer destination is a domain name and an individual name of a device such as PC that transmits character and picture information. The edition history is changes and date and times of the changes excluding changes of the edition history as well as edition (change) of character and picture information in a file and date and times of the edition in the management information data.

The system controller 1 generates digital watermark data of the management information (step S1705) and embeds the digital watermark data in the image data written in the MEM 16 (step S1706). The system controller 1 writes the image data embedded with a watermark in the image file generated this time in the accumulation area on the HDD 17. Then, the system controller 1 displays content of the management information on the liquid-crystal touch panel 79 (step S1708). Therefore, the image file generated includes the management information in both a form of management information data itself and a form of a digital watermark embedded in the image data.

Figure 19:
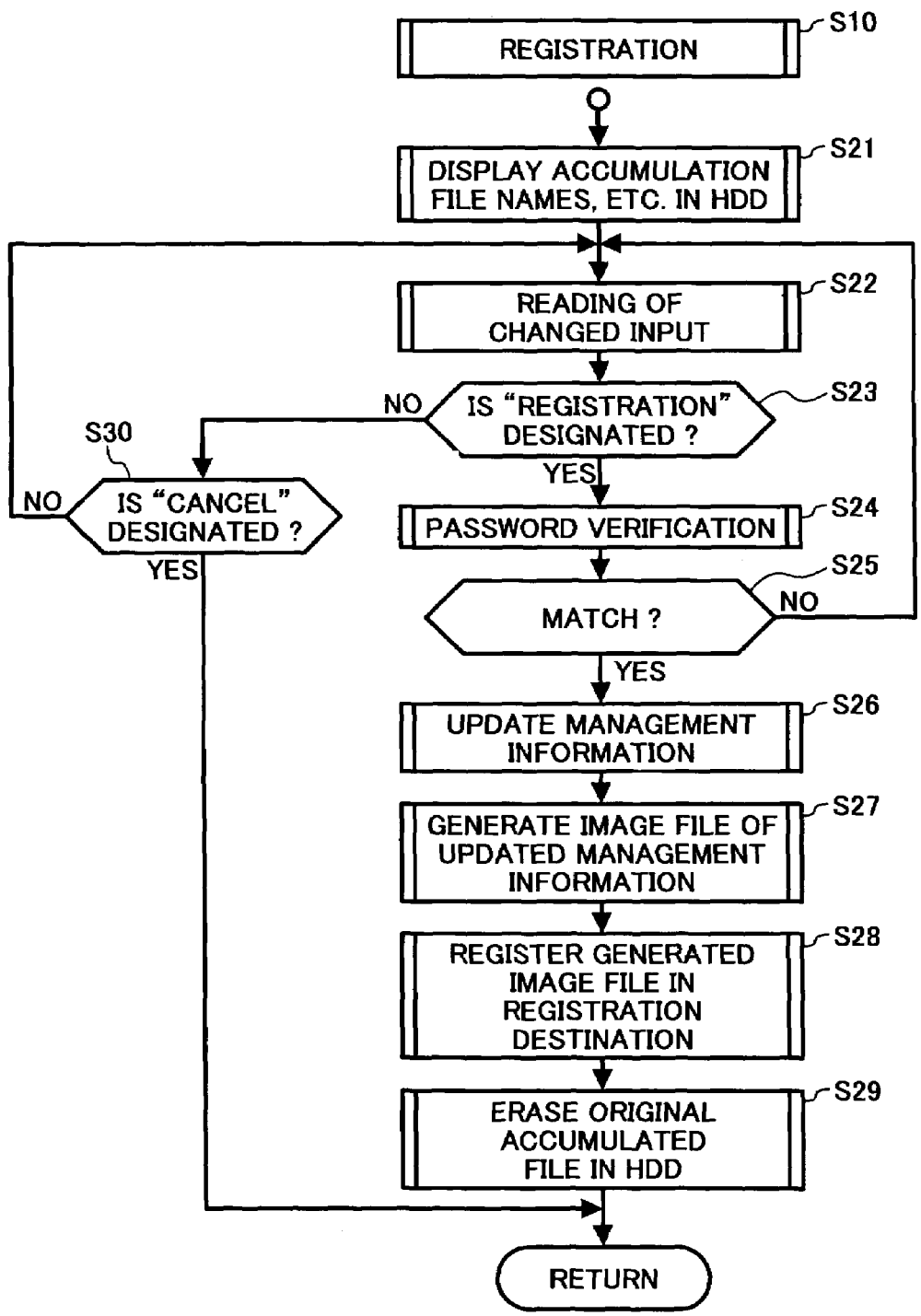
FIG. 19 is a flowchart of a registration processing in the image processing control shown in FIG. 15.

Referring to FIG. 19 the registration at step S10 shown in FIG. 15 is explained. The system controller 1 displays the registration screen on the liquid-crystal touch panel 79 and proceeds to the registration (step S10). The system controller 1 displays a name (a code) of the copying machine A1 in a registration-destination designation block on the registration screen, displays a last file name in the image file list in the accumulation area on the HDD 17 in a file-name designation block, and displays a data format of image data in a file of the file name in a type-of-a-file designation block (step S21). As the registration destination, other than the own apparatus (A1), it is possible to designate a server or a PC connected to the LAN or the network B. The server and the PC are registered in the own apparatus (A1) and switched to be displayed in the registration-destination designation block when the user operates a scroll key at the right end of the registration-destination designation block. The user can change the file name in the file-name designation block to another file name by operating the scroll key. The user can change the type of a file to another type by operating the scroll key.

When the registration destination, the file name, the type of a file, and the like are changed by the user, the system controller reads changed contents (step S22).

When the user operates the "registration" key on the registration screen (FIG. 17) (step S23), the system controller 1 reads setting (input) of the registration screen at that point. The system controller 1 displays a password verification screen on the liquid-crystal touch panel 79 as a popup screen (step S24). The system controller 1 judges whether a password input by the user coincides with a password in the management information of an image file of the designated file name (step S25). When it is judged that the passwords coincide with each other ("YES" at step S25), the system controller 1 updates the management information to management information in which the input of this time is reflected (step S26). Then, the system controller 1 generates an image file of the management information updated. In other words, the system controller 1 generates an image file that stores updated management information data and image data embedded with digital watermark data of the management information (step S27). The system controller 1 registers the image file in a registration destination (step S28). When the registration destination is the own apparatus (A1), the system controller 1 registers the image file in the registration area of the HDD 17. The system controller 1 deletes the original image file in the accumulation area of the HDD 17 (step S29).

Figure 21A:
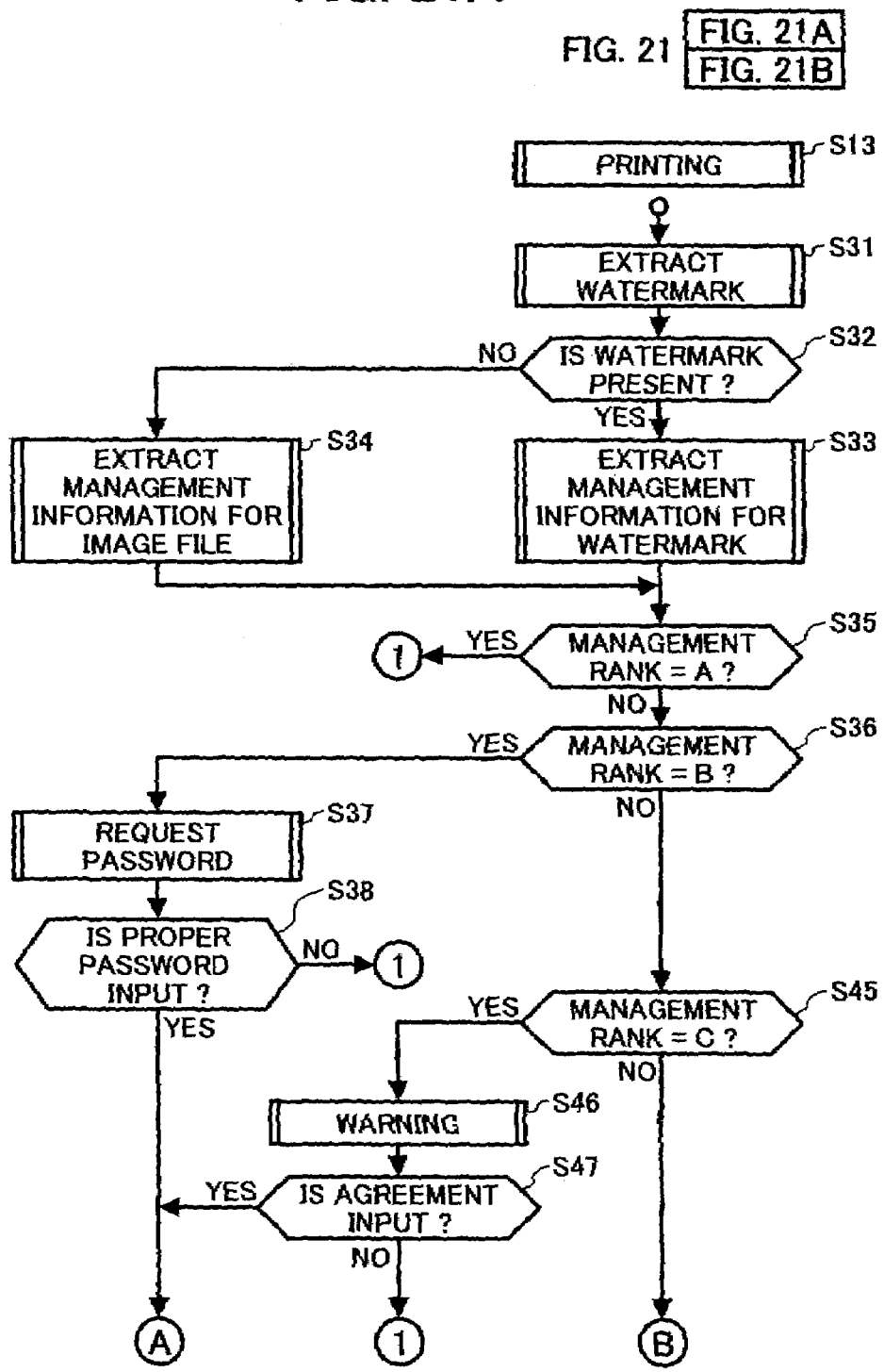
FIG. 21 is a flowchart of a print processing in the image processing control shown in FIG. 15.
Figure 21B:
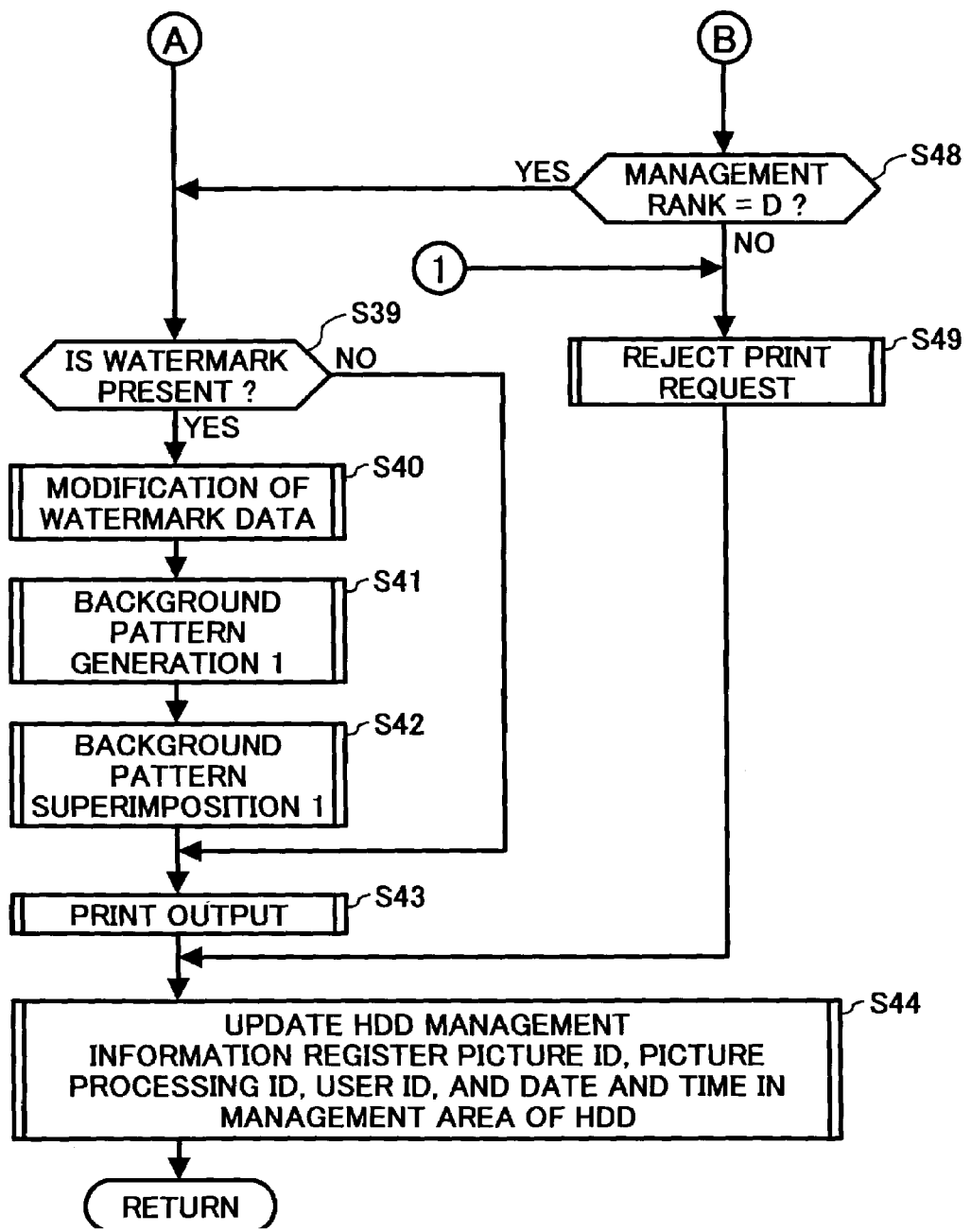

Referring to FIG. 21, the printing at step S13 shown in FIG. 15 is described. The system controller 1 displays the printing screen (FIG. 20) on the liquid-crystal touch panel 79 and displays a file list of the accumulation area and the registration area of the HDD 17 on the liquid-crystal touch panel 79. The user designates one file and operates the start key after the password verification ends properly. Then, in response to the operation of the start key, the system controller 1 proceeds to the printing (step S13) shown in FIG. 21. The system controller extracts digital watermark data of an image designated for printing (step S31). The system controller 1 judges whether a watermark is present (step S32). When a watermark is present, the system controller 1 reconstructs management information indicated in the watermark (step S33). When a watermark is not present, the system controller 1 extracts management information of the image file (step S34).

The system controller 1 judges whether rank data of the management information is the management rank A (step S35). When the rank data is the management rank A (step S35), the system controller 1 performs control for displaying information "printing of the designated document is prohibited, and the document is not printed" registered in the HDD 17 allocating to the management rank A on the liquid-crystal touch panel 79 (step S48). The system controller 1 registers rejection of a print instruction for the image file in the management area of the HDD 17 (step S43).

When the rank data is not the management rank A ("NO" at step S35), the system controller 1 judges whether the rank data is the management rank B (step S36).

When the rank data of the management information is the management rank B ("YES" at step S36), the system controller 1 displays information "please input a password" registered in the HDD 17 allocating to the management rank B on the liquid-crystal touch panel 79 (step S37). When the user inputs a password, the system controller 1 checks whether the password coincides with a password registered in the non-volatile memory in the system controller 1 (step S38).

When the passwords coincide with each other ("YES" at step S38), the system controller 1 judges whether a digital watermark is included in the image file (step S39).

When a watermark is included ("YES" at step S39), the data modification module 181 in the IMAC 13 modifies the watermark to data suitable for superimposition according to an instruction of the system controller 1 (step S40). Then, the "background pattern generation 1" 204a (FIG. 10) generates a background pattern image corresponding to the watermark (step S41). Thereafter, the "background pattern superimposition 1" 204b superimposes the background pattern image generated on character and picture information to generate a printing object image (step S42).

Thereafter, the system controller 1 outputs the printing object image generated to the printer 100 (step S43). When the printing ends, the system controller 1 writes a file ID of the printed image file, a character and picture processing ID (data representing completion of the printing), and a user ID in a character and picture information management table of the HDD 17 together with date and time information (step S44).

When the user does not input a password and when the password input does not coincide with the registered password, the system controller 1 displays information "printing is prohibited because of an invalid password, and printing is not performed" registered in the HDD 17 allocating to an authentication error case of the management rank B and on the liquid-crystal touch panel 79 (step S49). The system controller 1 writes a file ID of the image file designated for printing, a character and picture processing ID (data representing rejection of printing), and a user ID in the character and picture information management table of the HDD 17 together with date and time information (step S44).

When the rank data is not the management rank B ("NO" at step S36), the system controller 1 judges whether the rank data is the management rank C (step S45).

When the rank data of the management information is the management rank C ("YES" at step S45), the system controller 1 displays information "external use of a print is punishable. Do you agree? -YES-No-" registered in the HDD 17 allocating to the management rank C on the liquid-crystal touch panel 79 (step S46). Then, the system controller 1 receives a response indicating whether the user agrees with the treatment from the user (step S47).

When "-YES-" is input ("YES" at step S47), the system controller 1 performs processing for printing and updating information in the same manner as the processing described above (steps S39 to S44). When "-NO-" is input, the system controller 1 rejects printing (steps S49 and S44).

When the rank data is not the management rank C ("NO" at step S45), the system controller 1 judges whether the rank data is the management rank D (step S48).

When the rank data of the management information is the management rank D ("YES" at step S48), the system controller 1 prints character and picture information with the printer 100 in the same manner as the processing described above (steps S39 to S44). When none of the management ranks A to D is extracted ("NO" at step S48), the system controller 1 displays information "use of the printer is prohibited, and printing is not performed." on the liquid-crystal touch panel 79 (step S49) and updates the management information to end the processing (step S44).

Figure 22:
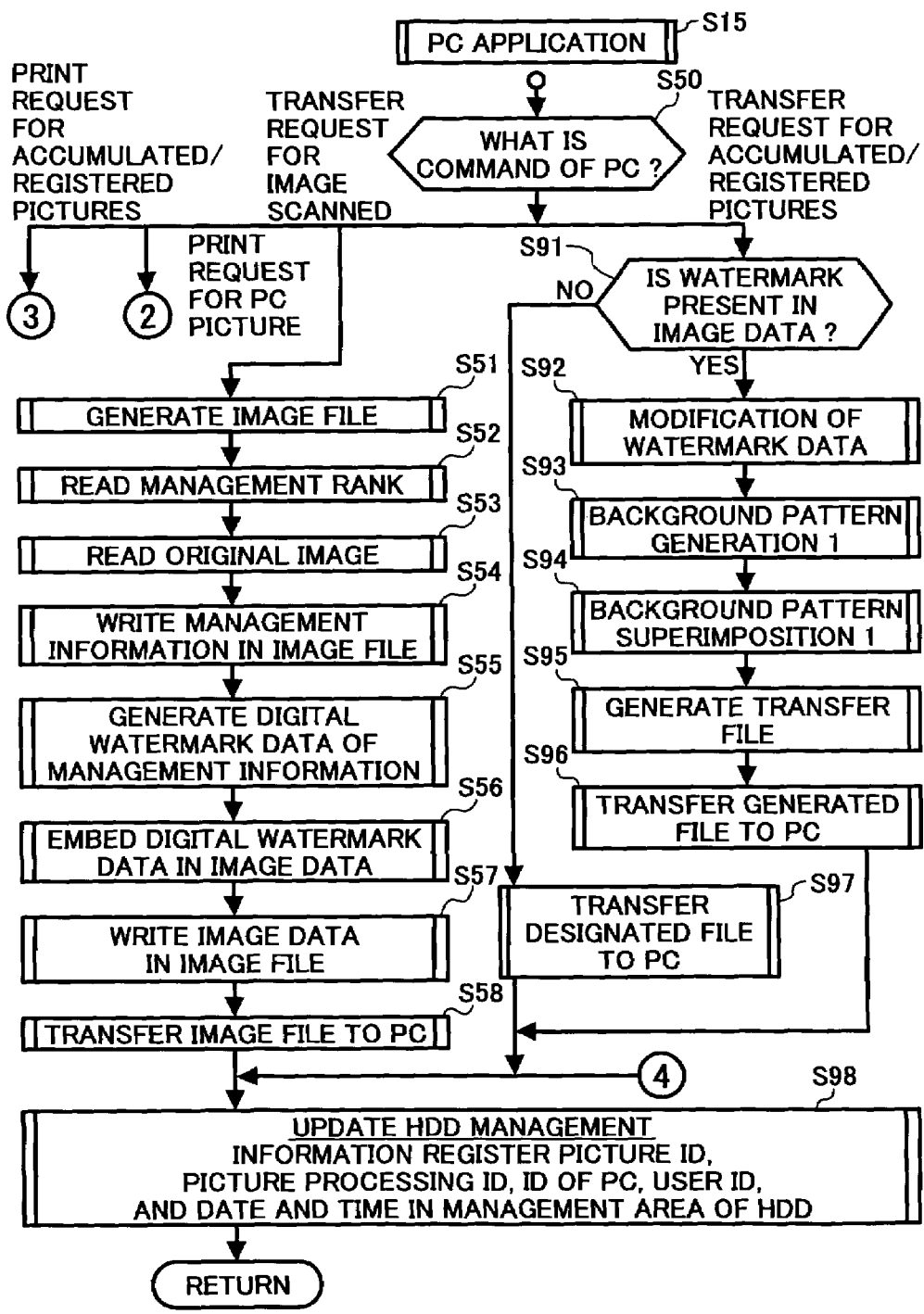
FIG. 22 is a flowchart of a PC application processing in the image processing control shown in FIG. 15.

The PC application (step S15) is explained with reference to FIGS. 22 and 223. When a picture transfer request command is sent from a PC, the system controller 1 stores an ID of the PC (an identification code; a PC name) and a user ID (an identification code; a user name), which are included in the command, in the internal memory of the system controller 1. The system controller 1 checks whether watermark data is present in image data of a designated image file on the HDD 17 using the image edition module 177 of the IMAC 13 (step S91).

When watermark data is present ("YES" at step S91), the data modification module 181 in the IMAC 13 modifies the watermark to data suitable for superimposition according to an instruction of the system controller 1 (step S92). The "background pattern generation 2" 202*a* of the IPP 15 generates a background pattern image corresponding to the watermark data (step S93). Thereafter, the "background pattern superimposition 2" 202*b* superimposes the background pattern image generated on the image file to generate an image file on which the background pattern image is superimposed (step S94). Thereafter, the system controller 1 transfers the image file to the PC (step S95).

When a watermark is not present ("NO" at step S91), the system controller 1 transfers the image file to the PC directly (step S97). In both the cases, the system controller 1 writes a file ID of the image file transferred, a character and picture processing ID (data representing delivery to the PC), an ID of the PC requesting the transfer, and a user ID in the character and picture information management table of the HDD 17 together with date and time information (step S98).

Figure 18:
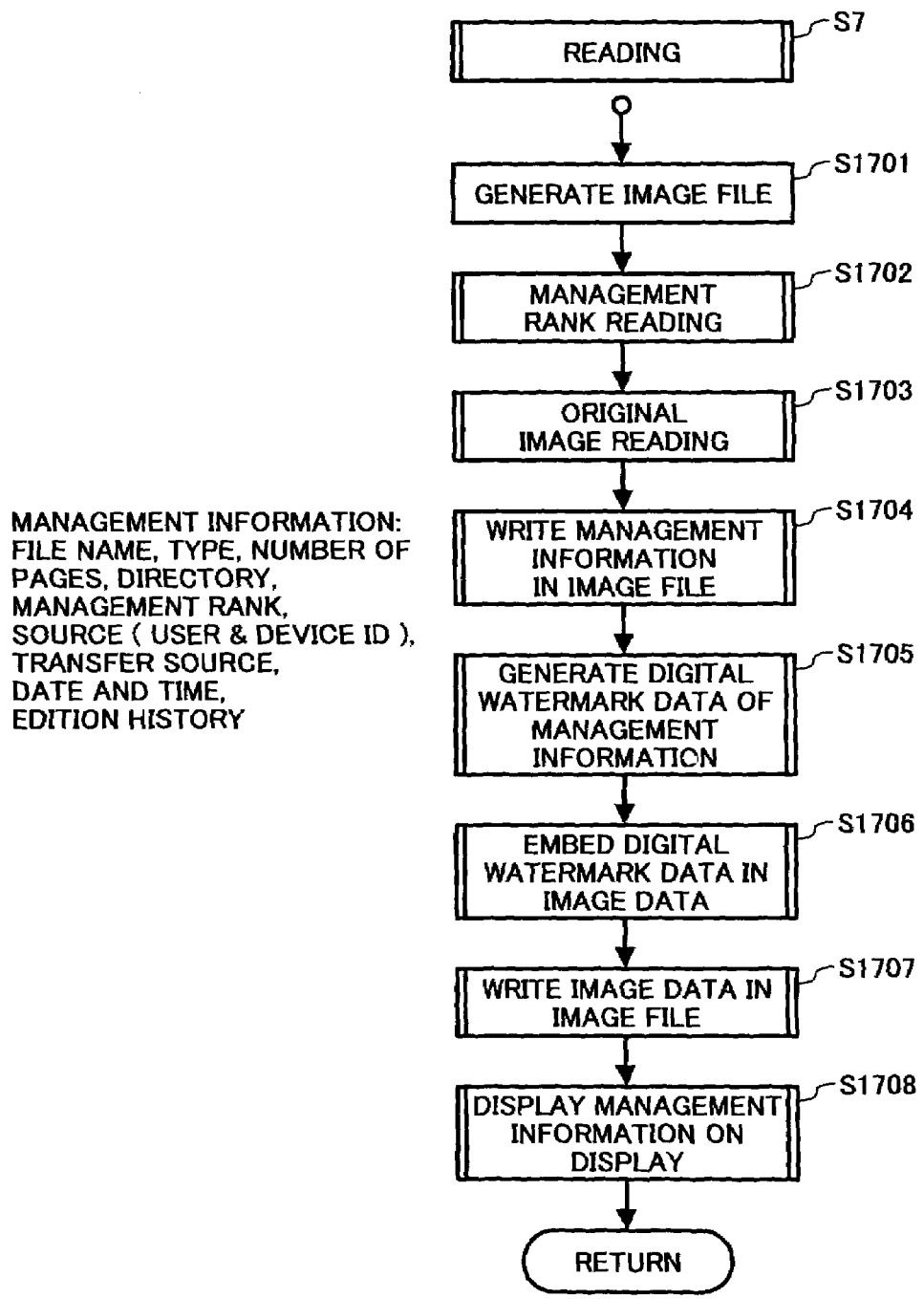
FIG. 18 is a flowchart of a reading processing in the image processing control shown in FIG. 15.

When the command from the PC is a scanner reading and transfer request, the system controller 1 generates an image file, reads an image, embeds a watermark in image data, and stores the image data in the image file in the same manner as the reading (step S7) shown in FIG. 18 that responds to a reading instruction from the operation board 20 (steps S51 to S57). Then, the system controller 1 transfers the image file to the PC (step S58). The system controller 1 writes a file ID of the image file transferred, a character and picture processing ID (data representing the delivery to the PC), an ID of the PC requesting the transfer, and a user ID in the character and picture information management table of the HDD 17 together with date and time information (step S98).

When the command from the PC is a print instruction for an image file from the PC, the system controller 1 performs watermark extraction with (the image edition module 177 of) the IMAC 13 and extracts watermark data embedded in image data of a PC picture (step S81). The system controller 1 accumulates an image file transferred by the PC in the HDD 17 (step S82). The system controller 1 extracts management information of a watermark and judges whether a watermark is present (step S62). When a watermark is not present, the system controller 1 extracts management information of the image file (step S64). When a watermark is present, the system controller 1 extracts the management information of the watermark (step S63).

The system controller 1 performs printing or rejection of printing corresponding to management rank information and password verification in the same manner as the printing (step S13) shown in FIG. 21, which responds to an instruction from the operation board 20, explained above (steps S65 to S78). Then, the system controller 1 writes a file ID of the image file designated for printing, a character and picture processing ID (printing or rejection of printing), an ID of the PC, and a user ID in the character and picture information management table of the HDD 17 together with date and time information (step S98).

When the command from the PC is a print request for an image file on the HDD 17, the system controller 1 extracts a watermark of image data in the same manner as step S91 described above (step S61). The system controller 1 performs printing or rejection of printing corresponding to management rank information and password verification in the same manner as the printing (step S13) shown in FIG. 21, which responds to an instruction from the operation board 20, explained above (steps S62 to S78). Then, the system controller 1 writes a file ID of the image file designated for printing, a character and picture processing ID (printing or rejection of printing), an ID of the PC, and a user ID in the character and picture information management table of the HDD 17 together with date and time information (step S97).

An application (program) for using the copying machine A1 is stored in the PC 1000 shown in FIG. 1. The user can start the application and instruct, on the operation screen, copying using the copying machine A1, original document reading using the color scanner 10 (and transfer to the PC1 or accumulation/registration of an image in the HDD 17 of the copying machine A1), printing of accumulated/registered pictures in the HDD 17 of the copying machine A1, printing of an image on the PC 1, facsimile transmission/reception and printing using the copying machine A1, accumulation/registration of an image on the PC in the copying machine A1, reading of an image file registered in the HDD 17 of the copying machine A1, and edition of the image file in the HDD 17 of the copying machine A1. Input/output functions of the operation screen displayed on the display of the PC 1 are equivalent to those of the operation board 20. It is possible to perform input/output operations, which can be performed by operating the operation board 20, on the display of the PC 1000 in the same manner. In this case, input is performed using a mouse and a keyboard.

Figure 23A:
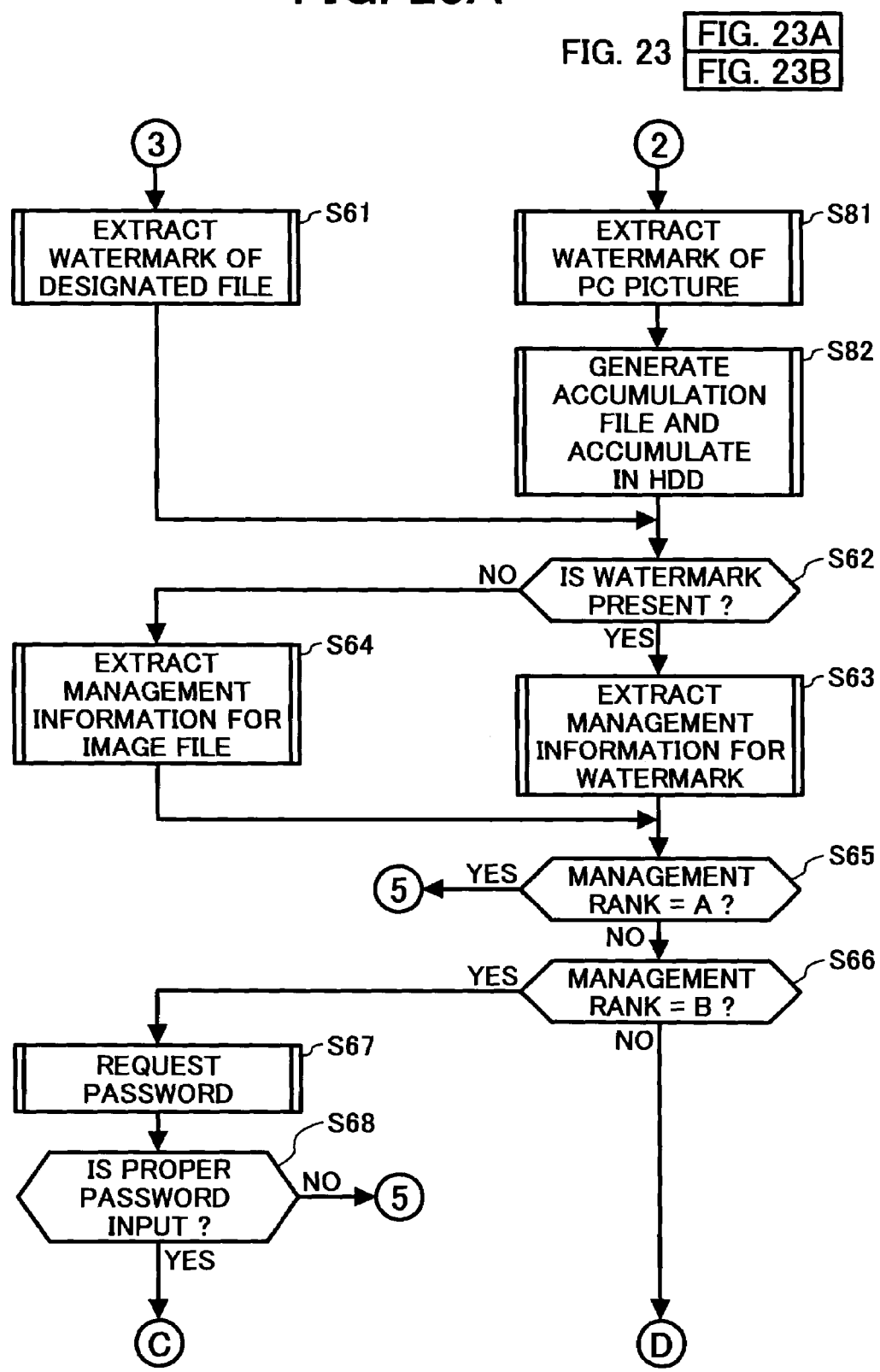
FIG. 23 is a flowchart of another PC application processing in the image processing control shown in FIG. 15.
Figure 23B:
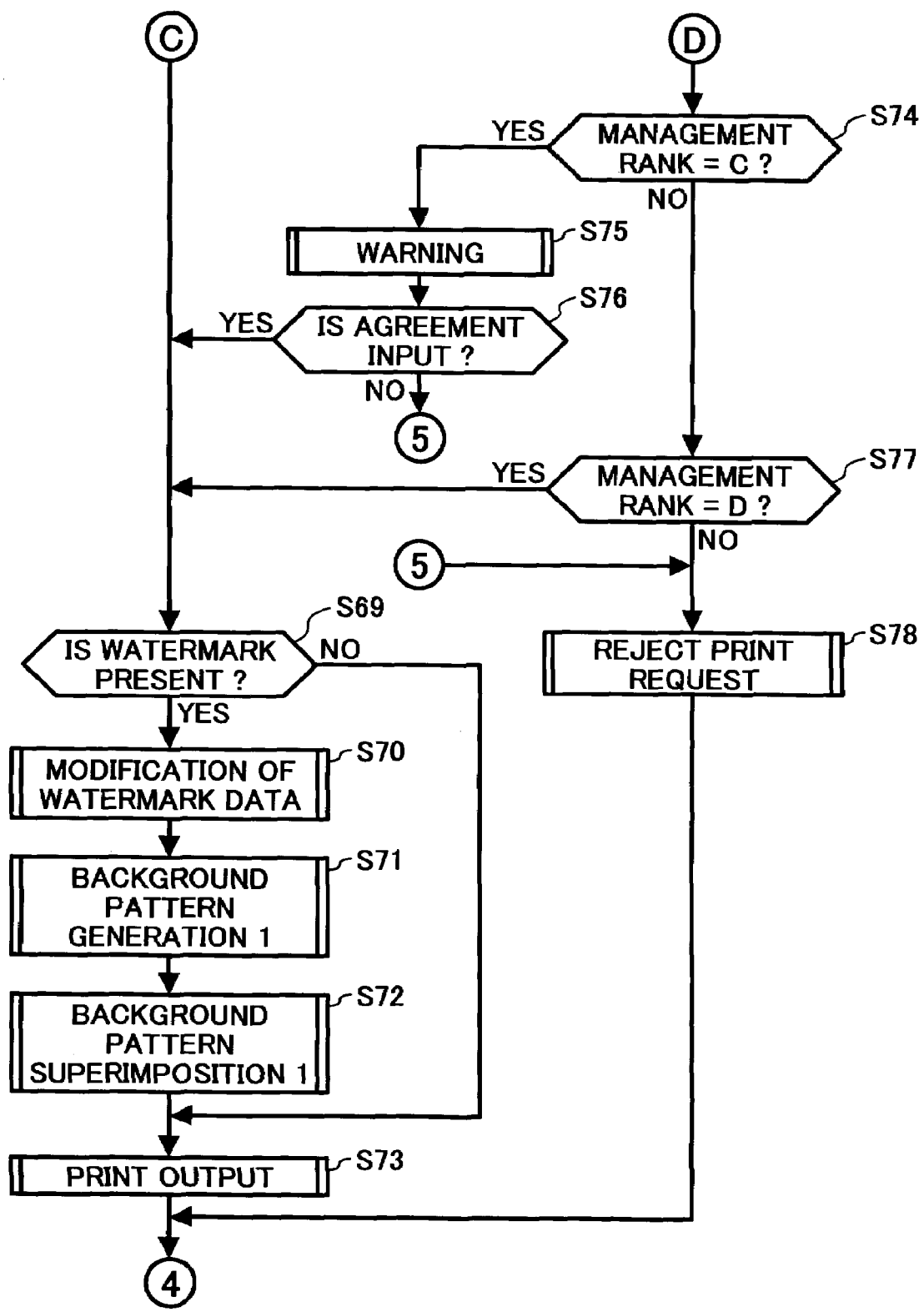
Figure 24A:
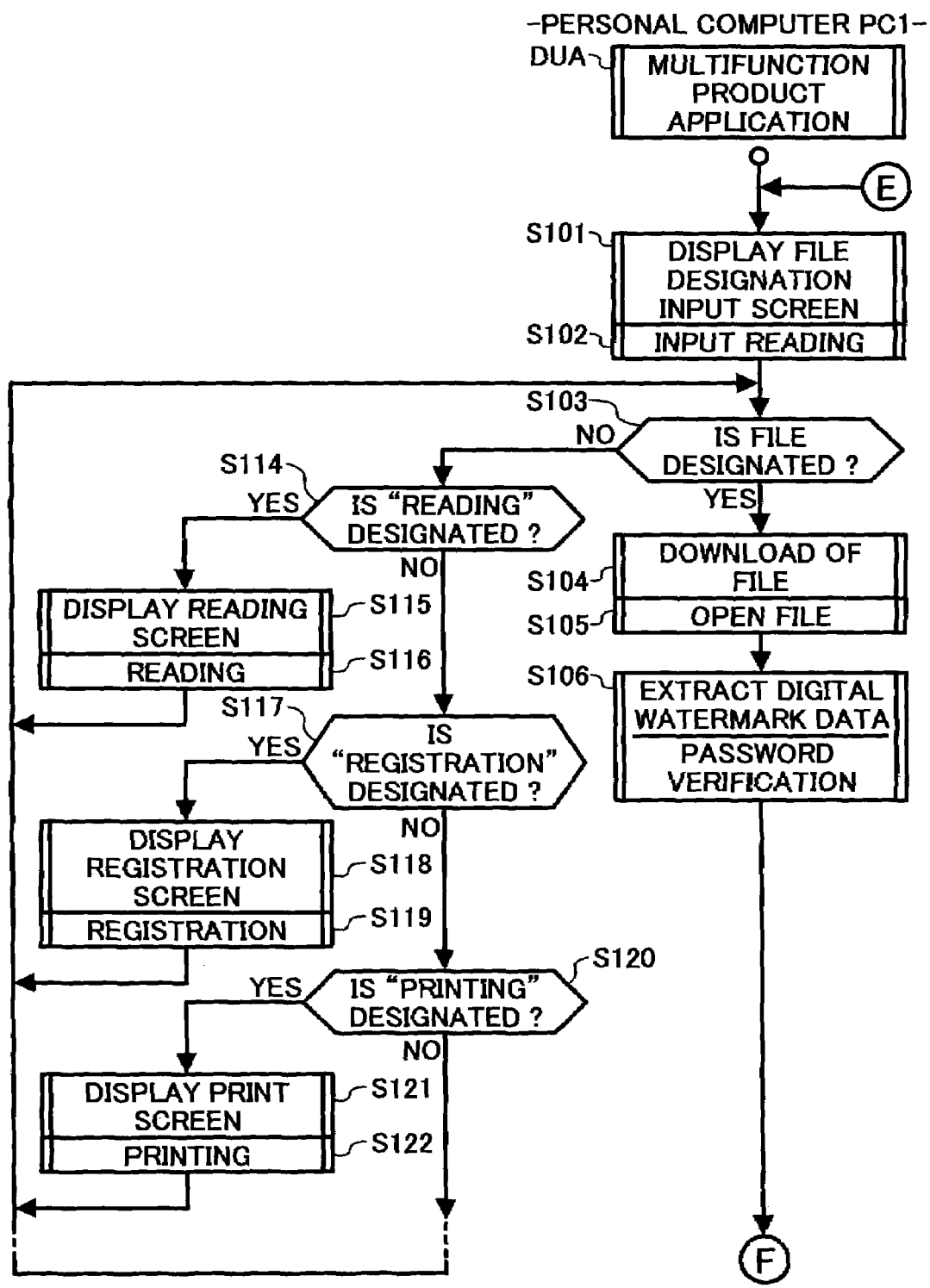
FIG. 24 is a flowchart of an image usage processing according to the embodiment.
Figure 24B:
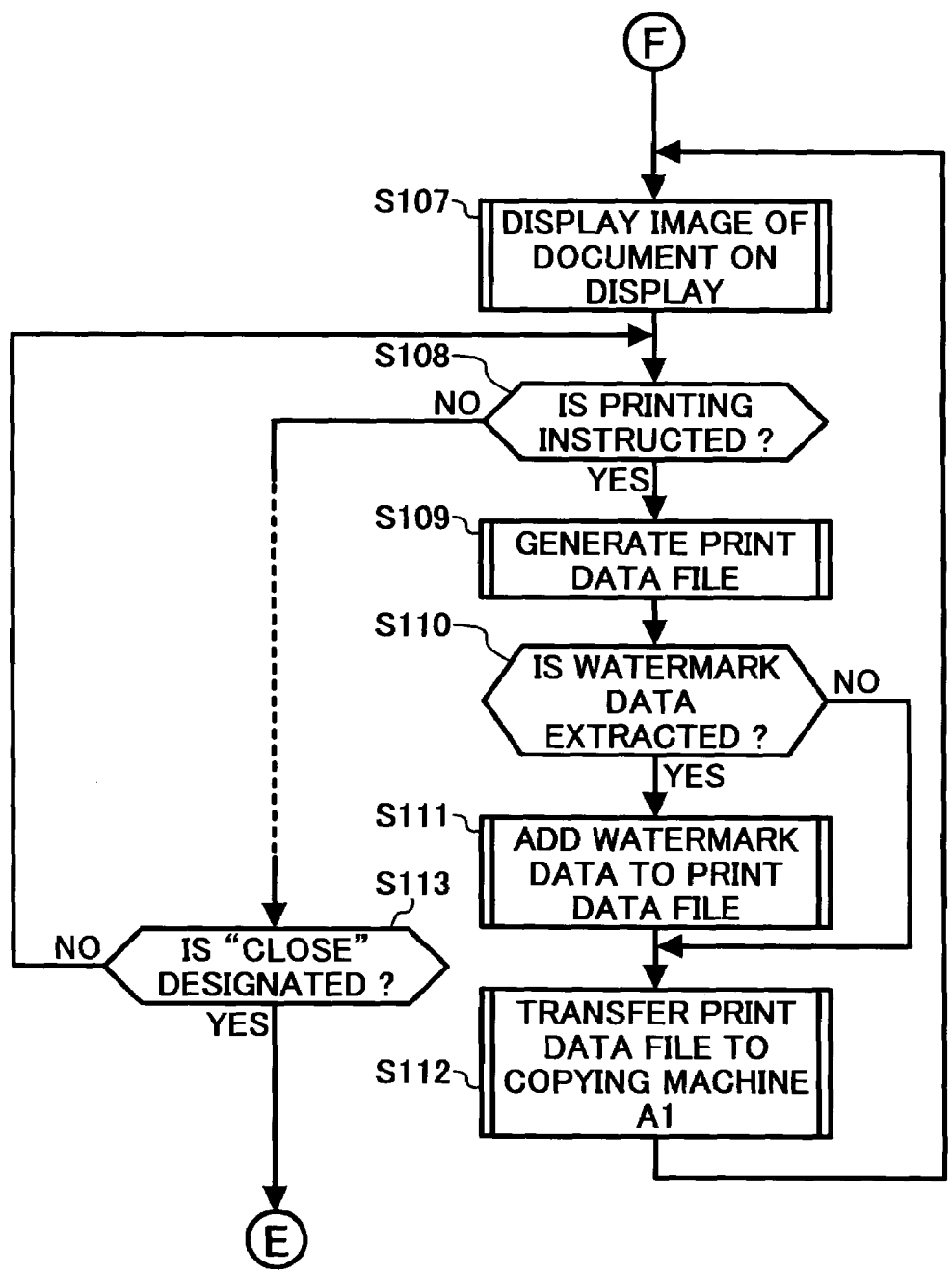
Figure 25:
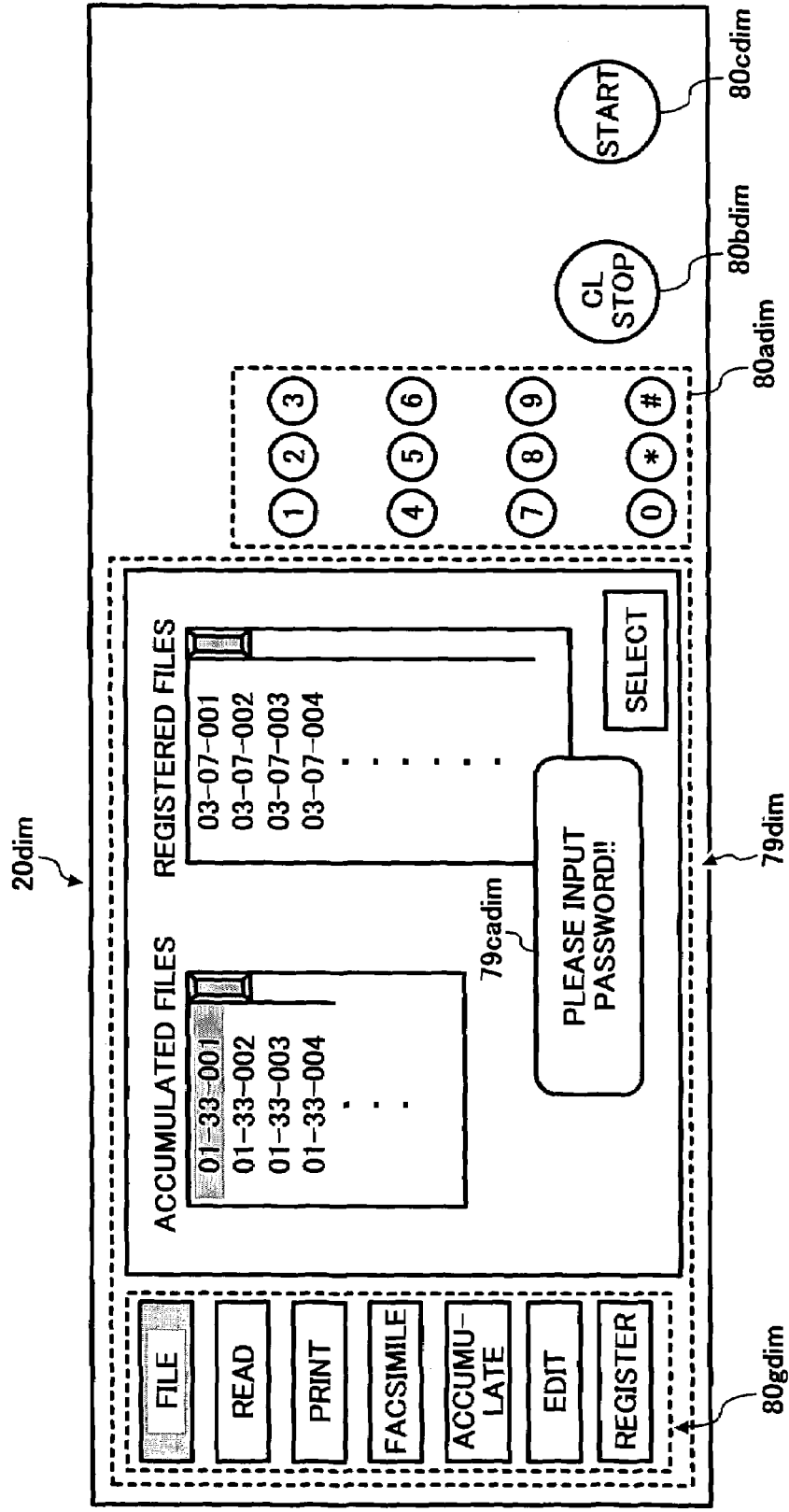
FIG. 25 is a schematic of an image file selection screen displayed on a display of the PC by the program "multifunction product application (DUA)" according to the embodiment.

FIG. 24 is a flowchart of an image usage processing of a document application (DUA) that uses the copying machine A1. When the document application DUA (hereinafter, "application DUA") is started, the application DUA displays an input screen shown in FIG. 25 on the display of the PC 1000 (step S101). At this point, when a "file" is set as initial display, the application DUA acquires a list of image files, which is stored in the HDD 17 of the copying machine A1, from the copying machine A1 and writes and displays the list on an input screen. A link to the copying machine A1 is set in the application DUA as a database of image files. A state in which the list is displayed is shown in FIG. 25. When a user designates a file, the application DUA downloads a designated image file from the copying machine A1 and opens the image file (steps S102 to S105). The application DUA extracts watermark data embedded in image data in the image file with the same function as the data extracting function 177*b* of the copying machine A1. When the extraction is successful (watermark data is present), the application DUA saves the watermark data in a register and deletes the watermark data from the image data. The application DUA verifies a password in association with a management rank of management information included in the watermark data (when a watermark is not present, management information of the image file) (step S106). When the image file is an image file for which password verification is not required and when a password input by a user coincides with a password registered in the copying machine A1, the application DUA expands the image data in a display memory and displays the image data on the display of the PC 1 (step S107). Thereafter, when printing of an image being displayed is instructed, the application DUA generates a print data file of the image being displayed and, when watermark data extracted in relation to the image is present, adds the watermark data to the image data and stores the image data in the print data file (steps S108 to S111). The application DUA transfers the print data file (a print command) to the copying machine A1 (step S112). When the copying machine A1 receives the transfer of the print data file, the system controller 1 of the copying machine A1 executes step S81 and the subsequent steps in FIG. 23.

When reading on the input screen shown in FIG. 25 is designated, the application DUA displays an input screen that is the same as the reading screen shown in FIG. 17 on the display of the PC 1 (step S115). The application DUA reads an input on the input screen by the user, and when a start instruction is input, transmits a reading instruction to the copying machine A1 together with data input on the reading screen. The system controller 1 of the copying machine A1 performs reading of an original image at step S51 and the subsequent steps in FIG. 22, generates an image file, and accumulates the image file in the HDD 17. The system controller 1 transfers the image file to the PC 1.

When registration on the input screen shown in FIG. 25 is designated, the application DUA displays a registration screen that is the same as the operation screen shown in FIG. 25. On the registration screen, the registration is selected and displayed instead of a file on the input screen shown in FIG. 25. When the user designates an image file on an accumulated file list and instructs start, the application DUA instructs the copying machine A1 to register the image file designated. When conditions defined by management information such as password verification are satisfied by the same processing as the processing at step S23 and the subsequent steps of the registration (step S10) in FIG. 19, the system controller 1 of the copying machine A1 stores the designated image file in the registration area of the HDD 17 and deletes the designated image file from the accumulation area.

When printing on the input screen shown in FIG. 25 is designated, the application DUA displays a print screen that is the same as the operation screen shown in FIG. 25. On the print screen, the printing is selected and displayed instead of the file on the input screen shown in FIG. 25. When the user designates an image file in the accumulated file list or the registered file list and designates start, the application DUA instructs the copying machine A1 to print the image file designated. When conditions defined by management information such as password verification are satisfied by the same processing as the processing at step 61 and the subsequent steps in FIG. 23, the system controller 1 of the copying machine A1 prints an image of the designated image file.

In the embodiment, data of a background pattern image corresponding to watermark data is superimposed on character and picture information. Consequently, although the background pattern image cannot be visually recognized usually when the image is output, it is possible to refer to the background pattern image by copying the image. Thus, although embedded information cannot be referred to usually like a digital watermark, when the embedded information is necessary, it is possible to use embedded watermark data by copying the image.

As described above, in the embodiment, a background pattern image is generated with watermark data as characters. However, the background pattern image is not limited to such a background pattern image. Any background pattern image may be generated as long as the background pattern image can be recognized by other apparatuses, users, or the like.

The embodiment does not limit image data used for superimposition on character and picture information of an image file to data of a background pattern image.

As an example different from this embodiment, image data used for superimposition may be visually recognizable image data. The visually recognizable image data is image data, a content of which a user or the like can grasp by referring to the image without using a special apparatus. Examples of the visually recognizable image data include an image showing character information such as a stamp, an icon, or date indication additionally. Consequently, after a superimposed image file is printed, the user can grasp a content embedded as a digital watermark by referring to a print.

In this way, the visually recognizable image corresponding to the digital watermark is superimposed on the image of the image file. Consequently, even when the image file is output to the outside of a system, which is operated by an apparatus that can read and extract the digital watermark such as the copying machine A1 in this embodiment, the user can visually recognize information embedded as a digital watermark in the system.

A background pattern image or visually recognizable image data to be used for superimposition may be selectable from a touch panel of an image forming apparatus or the like.

In this embodiment, at least one of deletion of data, addition of data, and change of data is performed as modification of watermark data. However, the modification of watermark data is not limited to the deletion, the addition, and the change.

In this embodiment, data managed as watermark data is held as a background pattern image. This makes it possible to acquire information held as a digital watermark even if the digital watermark cannot be recognized.

In this embodiment, even on the outside of a system operated by the copying machine A1 and extraction and embedding of a digital watermark according to the method used in the copying machine A1, a user can recognize information embedded as a digital watermark in the system. Thus, it is possible to use the information. In addition, it is possible to prevent copying without permission of a print on which the image is superimposed by, for example, causing the user to refer to a name of an author included in the superimposed image. Thus, even on the outside of the system operated by extraction and embedding of a digital watermark, it is possible to serve as a deterrent against counterfeiting and infringement of a copyright.

In this embodiment, the data modification module 181 applies modification to watermark data held in the MEM 16 or the HDD 17 and, then, generates a background pattern image corresponding to the watermark data. Thus, since the data is modified to data suitable for generating a background pattern image, usability of the background pattern image is improved. The data deletion module 181a included in the data modification module 181 makes it possible to delete unnecessary data in generating a background pattern image and store only necessary data in a data capacity that can be embedded in the background pattern image. The data addition module 181b makes it possible to add useful data to an image. In this embodiment, the data addition module 181b embeds management information held in advance in the background pattern image. Thus, the data addition module 181b makes it possible to embed effective data other than the watermark data as the background pattern image. The data change module 181c changes data to an optimum form. Thus, the data change module 181c makes it possible to improve visibility of the embedded data and reduce an amount of unnecessary data.

(Note 1) An image processing apparatus comprising:
a storing unit (MEM, HDD) that accumulates image information;
a unit (1, IMAC) that reads image information, transfer of which is requested by an external apparatus (PC 1000) through communication, from the storing unit;
a unit (177b) that extracts watermark data of the image information read out;
a unit (IPP) that combines a background pattern image corresponding to the watermark data extracted with an image represented by the read-out image information; and
a unit (1, CDIC, IMAC) that delivers image information represented by the image combined to the external apparatus (PC 1000) through communication.

(Note 2) The image processing apparatus according to note 1, further comprising:
an imaging apparatus (10) including an imaging device (207) and a unit (SBU) that converts an image signal generated by the imaging device into digital data, that is, image data;
a unit (1) that generates management information for the image data generated by the imaging apparatus (10);
a unit (1, 177a) that generates watermark data including the management information and adds the watermark data to the image data; and
a unit (IMAC) that accumulates the image data added with the watermark data in a storing unit (MEM, HDD) of the image processing apparatus (ACP).

This makes it possible to read a document, which is required to be kept secret, with the imaging apparatus (10), add watermark data to the document, and store the document in the storing unit (MEM, HDD). Consequently, a secrecy effect indicated in note 1 can be expected.

(Note 3) The image processing apparatus according to note 1 or 2, further comprising a printer (100) that prints an image represented by the image information on a sheet.

This makes it possible to print out image information stored in the storing unit (MEM, HDD) with the printer (100). If a background pattern image is composed at the time of the print-out in the same manner as at the time of transmission by communication, it is easy to track and manage a print image. Thus, an effect that the image information is prevented from being used for wrong purposes can be expected.

(Note 4) The image processing apparatus according to note 2, further comprising a printer (100) that prints an image represented by the image information on a sheet, wherein the image processing apparatus applies image data processing (190) for correcting distortion in image reading to image information generated by the imaging apparatus (10) and applies image data processing (300) for adjusting image information to a print characteristic of the printer to image information used for printing by the printer (100).

Consequently, image information having high reproducibility is obtained and a printed image having high reproducibility is obtained.

(Note 5) The image processing apparatus according to note 3 or 4, further comprising:
a unit (1, IMAC) that receives image information, printing of which is instructed, through communication;
a unit (177b) that extracts watermark data included in the image information received; and
a unit (IPP) that combines a background pattern image corresponding to the data extracted with an image represented by the image information, wherein
the image processing apparatus prints the image combined on a sheet with the printer.

Consequently, when an external apparatus sends image information added with watermark data to the image processing apparatus and instructs the image processing apparatus to print the image information, image information combined with a background pattern image is printed. Thus, it is easy to confirm a source, and an effect that the image information is prevented from being used for wrong purposes can be expected.

(Note 6) The image processing apparatus according to note 5, further comprising a unit (1, IMAC) that accumulates image information, printing of which is instructed, received through communication in the storing unit (MEM, HDD).

This makes it possible to, even after printout of image information by a user of an external apparatus, checks image information accumulated in the storing unit (MEM, HDD), print out the image information as required, and track a history of the image information based on a background pattern image.

(Note 7) The image processing apparatus according to any one of notes 3 to 6, further comprising a unit (20) that instructs printing of image information stored in the storing unit, wherein the image processing apparatus extracts watermark data from image information read out from the storing unit according to the instruction, combines a background pattern image corresponding to the data extracted with an image represented by the read-out image information, and prints the image combined with the printer.

This makes it possible to operate the instructing unit (20) and print image information stored in the storing unit. If image information having watermark data is printed together with a background pattern image, a high secrecy effect can be expected.

(Note 8) The image processing apparatus according to an one of notes 3 to 7, wherein the image processing apparatus reads out image information in the storing unit, printing of which is requested by an external apparatus through communication, extracts watermark data from the image information read out, combines a background pattern image corresponding to the watermark data extracted with an image represented by the read-out image information, and prints the image combined with the printer.

Consequently, even when printing of image information stored in the storing unit is instructed from the external apparatus (PCI), image information having watermark data is printed together with a background pattern image. Thus, a secrecy effect can be expected.

(Note 9) The image processing apparatus according to note 1, note 5, note 7, or note 8, in combining the background pattern image, when the image information is document data, the image processing apparatus converts the image information into an image and combines information of a pixel bit of background pattern image data with information of a pixel bit of the image (202) and, when the image information is image data, the image processing apparatus combines information of a pixel bit of background pattern image data with information of a pixel bit of the image information (204).

Consequently, since the image information combined with a background pattern is pixel data bit combined with background pattern information, it is impossible to delete the background pattern information from the image information. Thus, reliability for holding the background pattern information is high.

(Note 10) The image processing apparatus according to note 5, note 7, or note 8, wherein the image processing apparatus converts the image information to be printed into print image data of one pixel/one bit for printing and, then, combines information of respective bits of background pattern image data of one pixel/one bit with information of respective bits (300).

Consequently, since image information combined with a background pattern image is image information representing one pixel with one bit and respective bits are combined with background pattern image information, it is impossible to delete the background pattern information from the image information. Thus, reliability for holding the background pattern information is high.

(Note 11) An image processing system, comprising:
an image processing apparatus including:
a storing unit (MEM, HDD) that accumulates image information;
a unit (1, IMAC) that reads image information from and writes image information in the storing unit;
a unit (177b) that extracts watermark data added to image information;
a unit (IPP) that combines a background pattern image corresponding to watermark data with an image represented by image information;
a communication unit (8); and
a control unit (1, IMAC) that controls the respective units and transmits and receives image information to and from an information processing unit (PC 1), and
the information processing unit (PC 1) that transmits and receives image information to and from the image processing apparatus through communication, wherein
the information processing unit (PC 1) designates image information stored in the storing unit (MEM, HDD) and instructs transmission of the image information to the information processing unit (PC 1), and
the control unit (1, IMAC) reads out the image information instructed from the storing unit (MEM, HDD) according to the instruction, extracts watermark data added to image information read out, combines a background pattern image corresponding to the watermark data with an image represented by the image information, and delivers the image to the information processing unit (PC 1).

Consequently, the effect indicated in note 1 can be expected in the image processing system in which the information processing unit such has the PC 1000 is connected to the image processing apparatus by a private communication line or a network.

(Note 12) The image processing system according to note 11, wherein the image processing apparatus further includes:
an imaging apparatus (10) including an imaging device (207) and a unit (SBU) that converts an image signal generated by the imaging device into digital data, that is, image data;
a unit (1) that generates management information for the image data generated by the imaging apparatus (10);
a unit (1, 177a) that generates watermark data including the management information and adds the watermark data to the image data; and
a unit (IMAC) that accumulates the image data added with the watermark data in a storing unit (MEM, HDD).

Consequently, the effect indicated in note 2 can be expected in the image processing system in which the information processing unit such has the PC 1000 is connected to the image processing apparatus by a private communication line or a network.

(Note 13) The image processing system according to note 11 or 12, wherein the image processing apparatus further includes a printer (100) that prints an image represented by the image information on a sheet.

Consequently, the effect indicated in note 3 can be expected in the image processing system in which the information processing unit such has the PC 1000 is connected to the image processing apparatus by a private communication line or a network.

(Note 14) The image processing system according to note 12, wherein
the image processing apparatus further includes a printer (100) that prints an image represented by the image information on a sheet, and
the image processing apparatus applies image data processing (190) for correcting distortion in image reading to image information generated by the imaging apparatus (10) and applies image data processing (300) for adjusting image information to a print characteristic of the printer to image information used for printing by the printer (100).

Consequently, the effect indicated in note 4 can be expected in the image processing system in which the information processing unit such has the PC 1000 is connected to the image processing apparatus by a private communication line or a network.

(Note 15) The image processing system according to note 13 or 14, wherein the image processing apparatus further includes:

a unit (1, IMAC) that receives image information, printing of which is instructed, through communication;

a unit (177*b*) that extracts watermark data included in the image information received; and a unit (IPP) that combines a background pattern image corresponding to the data extracted with an image represented by the image information, and the image processing apparatus prints the image combined on a sheet with the printer.

Consequently, the effect indicated in note 5 can be expected in the image processing system in which the information processing unit such has the PC 1000 is connected to the image processing apparatus by a private communication line or a network.

(Note 16) The image processing system according to note 15, wherein the image processing apparatus further includes a unit (1, IMAC) that accumulates image information, printing of which is instructed, received through communication in the storing unit (MEM, HDD).

Consequently, the effect indicated in note 6 can be expected in the image processing system in which the information processing unit such has the PC 1000 is connected to the image processing apparatus by a private communication line or a network.

(Note 17) The image processing system according to any one of notes 13 to 16, wherein the image processing apparatus further includes a unit (20) that instructs printing of image information stored in the storing unit, and the image processing apparatus extracts watermark data from image information read out from the storing unit according to the instruction, combines a background pattern image corresponding to the data extracted with an image represented by the read-out image information, and prints the image combined with the printer.

Consequently, the effect indicated in note 7 can be expected in the image processing system in which the information processing unit such has the PC 1000 is connected to the image processing apparatus by a private communication line or a network.

(Note 18) The image processing system according to any one of notes 13 to 17, wherein the image processing apparatus reads out image information in the storing unit, printing of which is requested by an external apparatus through communication, extracts watermark data from the image information read out, combines a background pattern image corresponding to the watermark data extracted with an image represented by the read-out image information, and prints the image combined with the printer.

Consequently, the effect indicated in note 8 can be expected in the image processing system in which the information processing unit such has the PC 1000 is connected to the image processing apparatus by a private communication line or a network.

(Note 19) The image processing system according to note 11, note 15, note 17, or note 18, wherein, in combining the background pattern image, when the image information is document data, the image processing apparatus converts the image information into an image and combines information of a pixel bit of background pattern image data with information of a pixel bit of the image (202) and, when the image information is image data, the image processing apparatus combines information of a pixel bit of background pattern image data with information of a pixel bit of the image information (204).

Consequently, the effect indicated in note 9 can be expected in the image processing system in which the information processing unit such has the PC 1000 is connected to the image processing apparatus by a private communication line or a network.

(Note 20) The image processing system according to note 11, wherein the information processing unit (PC 1) extracts watermark data added to image information downloaded from the image processing apparatus and deletes the watermark data from the image information (106 in FIG. 24) and, in delivering the image information through communication, adds watermark data extracted to the image information and delivers the image information.

Consequently, the effect indicated in note 10 can be expected in the image processing system in which the information processing unit such has the PC 1000 is connected to the image processing apparatus by a private communication line or a network.

(Note 21) The image processing system according to note 20, wherein the information processing unit (PC 1) displays the image information, from which the watermark data is deleted, on a display.

Consequently, only an image originally represented by the image information, in which the watermark data never appears as noise, is displayed on the display. Since presence of the watermark data is not seen on the display, there is an effect in confidentiality of the watermark data.

With such a constitution, even if image information is transferred from an external apparatus to another external apparatus, a background pattern image appears in a printed image. Therefore, people hesitate to use the image information for wrong purposes. As a result, it becomes easy to track and manage the image information. In addition, there is an effect that the image information is prevented from being used for wrong purposes.

According to one embodiment of the present invention, it is possible to prevent counterfeiting of an image and prevent infringement of a copyright even under an environment in which there is no method of extracting watermark data.

Moreover, according to one embodiment of the present invention, usability of a watermark-embedded image is improved.

Furthermore, according to one embodiment of the present invention, it is possible to store only necessary data depending on a capacity for embedding the watermark in an image.

Moreover, according to one embodiment of the present invention, it is possible to improve usability of data embedded as the watermark.

Furthermore, according to one embodiment of the present invention, it is possible to acquire information held as the watermark data easily.

Moreover, according to one embodiment of the present invention, it is possible to refer to the image information while keeping the image information usually visually unrecognizable.

Furthermore, according to one embodiment of the present invention, it is possible to use the information that has been embedded as a digital watermark.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:
   an extracting unit to extract digital watermark data from image data;
   a generating unit to generate a first background-pattern image based on the digital watermark data and a second background-pattern image including identification information for identifying the digital watermark data; and
   a superimposing unit to superimpose the first background-pattern image and the second background-pattern image on the image data, wherein the identification information is input by accessing a URL attached to the image data.

2. The image processing apparatus according to claim 1, further comprising a modifying unit to modify the digital watermark data, wherein the generating unit generates a watermark image based on modified digital watermark data.

3. The image processing apparatus according to claim 2, wherein the modifying unit includes a deleting unit configured to delete data from the digital watermark data.

4. The image processing apparatus according to claim 2, wherein the modifying unit includes an adding unit to add data to the digital watermark data.

5. The image processing apparatus according to claim 4, further comprising a management-information generating unit to generate management information for managing the image data, wherein the data includes the management information.

6. The image processing apparatus according to claim 2, wherein the modifying unit includes a changing unit to change data in the digital watermark data.

7. The image processing apparatus according to claim 2, wherein the generating unit is operable to generate identification information for identifying the digital watermark data.

8. The image processing apparatus according to claim 2, wherein the watermark image includes a background-pattern image.

9. The image processing apparatus according to claim 2, wherein the watermark image is visually recognizable.

10. The image processing apparatus according to claim 1, further comprising a receiving unit to receive the image data through digital communications.

11. A method of processing an image, comprising:
    extracting, by an image processing apparatus, digital watermark data from image data;
    generating, by an image processing apparatus, a first background-pattern image based on the digital watermark data and a second background-pattern image including identification information for identifying the digital watermark data; and
    superimposing, by an image processing apparatus, the first background-pattern image and the second background-pattern image on the image data, wherein the identification information is input by accessing a URL attached to the image data.

12. The method according to claim 11, further comprising modifying the watermark data, wherein generating the digital watermark image includes generating a watermark image based on modified watermark data.

13. The method according to claim 12, wherein the modifying the watermark data includes deleting data from the digital watermark data.

14. The method according to claim 12, wherein the modifying the watermark data includes adding data to the digital watermark data.

15. The method according to claim 14, further comprising generating management information for managing the image data, wherein the data includes the management information.

16. The method according to claim 12, wherein the modifying the watermark data includes changing data in the digital watermark data.

17. The method according to claim 12, wherein the generating the watermark image includes generating identification information for identifying the digital watermark data.

18. The method according to claim 12, wherein the watermark image includes a background-pattern image.

19. The method according to claim 12, wherein the watermark image is visually recognizable.

20. The method according to claim 11, further comprising receiving the image data through digital communications.

21. A computer-readable recording medium stores a computer program, which when executed by computer, causes the computer to process an image by:
    extracting digital watermark data from image data;
    generating a first background-pattern image based on the digital watermark data and a second background-pattern image including identification information for identifying the digital watermark data; and
    superimposing the first background-pattern image and the second background-pattern image on the image data, wherein the identification information is input by accessing a URL attached to the image data.

* * * * *